US009741352B2

(12) United States Patent
Jeong et al.

(10) Patent No.: US 9,741,352 B2
(45) **Date of Patent: *Aug. 22, 2017**

(54) METHOD AND APPARATUS FOR PROCESSING AN AUDIO SIGNAL

(71) Applicants: LG Electronics Inc., Seoul (KR); CHUNGBUK NATIONAL UNIVERSITY INDUSTRY-ACADEMIC COOPERATION FOUNDATION, ChungBuk (KR)

(72) Inventors: Gyuhyeok Jeong, Seoul (JP); Daehwan Kim, Seoul (KR); Ingyu Kang, Seoul (KR); Lagyoung Kim, Seoul (KR); Kibong Hong, ChungBuk (KR); Zhigang Piao, ChungBuk (KR); Insung Lee, ChungBuk (KR); Jongha Lim, ChungBuk (KR); Sanghyeon Moon, ChungBuk (KR); Byungsuk Lee, Seoul (KR); Hyejeong Jeon, Seoul (KR)

(73) Assignees: LG Electronics Inc., Seoul (KR); Chungbuk National University Industry-Academic Cooperation Foundation (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/089,918

(22) Filed: Apr. 4, 2016

(65) Prior Publication Data

US 2016/0217801 A1 Jul. 28, 2016

Related U.S. Application Data

(63) Continuation of application No. 13/522,274, filed as application No. PCT/KR2011/000324 on Jan. 17, 2011, now Pat. No. 9,305,563.

(Continued)

(51) Int. Cl.
*G06F 17/00* (2006.01)
*G10L 19/038* (2013.01)
(Continued)

(52) U.S. Cl.
CPC .......... *G10L 19/038* (2013.01); *G10L 19/002* (2013.01); *G10L 19/0204* (2013.01);
(Continued)

(58) Field of Classification Search
CPC ............... G10L 19/0208; G10L 19/265; G10L 21/0232; G10L 21/038; G10L 19/028; G10L 19/02; G10L 19/002
See application file for complete search history.

(56) References Cited

U.S. PATENT DOCUMENTS 7,801,733 B2 9/2010 Lee
7,933,769 B2 4/2011 Bessette
(Continued)

FOREIGN PATENT DOCUMENTS

CN 1957398 A 5/2007
EP 1 677 289 A2 7/2006
(Continued)

OTHER PUBLICATIONS

International Search Report dated Sep. 20, 2011 for Application No. PCT/KR2011/000324, with English Translation, 4 pages.
(Continued)

*Primary Examiner* — Andrew C Flanders
(74) *Attorney, Agent, or Firm* — Fish & Richardson P.C.

(57) ABSTRACT

The present invention relates to a method for processing an audio signal, comprising: a step of performing a frequency conversion process on an audio signal to obtain a plurality of frequency transform coefficients; a step of selecting either a general mode or a non-general mode, on the basis of a pulse ratio, for the frequency transform coefficients having (Continued)

100 a high frequency band from among the plurality of frequency transform coefficients; and a step of performing, if the non-general mode is selected, the following steps: extracting a predetermined number of pulses from the frequency transform coefficients having the high frequency band, and generating pulse information; generating an original noise signal from the frequency transform coefficients having the high frequency band, excluding the pulses; generating a reference noise signal using the frequency transform coefficient having a low frequency band from among the plurality of frequency transform coefficients; and generating noise position information and noise energy information using the original noise signal and the reference noise signal.

5 Claims, 25 Drawing Sheets

Related U.S. Application Data

(60) Provisional application No. 61/295,170, filed on Jan. 15, 2010, provisional application No. 61/349,192, filed on May 27, 2010, provisional application No. 61/377,448, filed on Aug. 26, 2010, provisional application No. 61/426,502, filed on Dec. 22, 2010.

(51) Int. Cl.

| | |
|---|---|
| ***G10L 19/20*** | (2013.01) |
| ***G10L 19/028*** | (2013.01) |
| ***G10L 19/002*** | (2013.01) |
| *G10L 19/02* | (2013.01) |
| *G10L 19/22* | (2013.01) |
| *G10L 21/038* | (2013.01) |

(52) U.S. Cl.

CPC ............ *G10L 19/028* (2013.01); *G10L 19/20* (2013.01); *G10L 19/0212* (2013.01); *G10L 19/22* (2013.01); *G10L 21/038* (2013.01)

(56) References Cited

U.S. PATENT DOCUMENTS

| | | | | |
|---|---|---|---|---|
| 2003/0093271 | A1 | 5/2003 | Tsushima | |
| 2006/0149538 | A1 | 7/2006 | Lee | |
| 2007/0225971 | A1 | 9/2007 | Bessette | |
| 2007/0282603 | A1 | 12/2007 | Bessette | |
| 2008/0126084 | A1 | 5/2008 | Lee | |
| 2008/0270124 | A1 | 10/2008 | Son | |
| 2013/0060365 | A1* | 3/2013 | Jeong ...................... | G10L 19/20 700/94 |

FOREIGN PATENT DOCUMENTS

| | | | |
|---|---|---|---|
| EP | 1 677 289 | A3 | 12/2008 |
| KR | 10-2006-0078362 | A | 7/2006 |
| KR | 10-0788706 | B1 | 12/2007 |
| KR | 10-2010-0124678 | | 11/2010 |
| RE | 10-2008-0095492 | A | 10/2008 |
| WO | WO 00/45379 | A2 | 8/2000 |
| WO | WO 2005/078706 | A1 | 8/2005 |
| WO | WO 2008/066268 | A1 | 6/2008 |
| WO | WO 2009/055493 | A1 | 4/2009 |

OTHER PUBLICATIONS

Kim, Hyeon U. et al., "The Trend of G.7291 Wideband Multi-codec Technology, Electronics and Telecommunications Trends", Dec. 2006, vol. 21 No. 6, pp. 77-85 (See pp. 80, 81, figures 4,5), partial translation.
PCT Written Opinion and International Search Report, with English translation, dated Sep. 20, 2011 for Application No. PCT/KR2011/000324, 19, pages.
Chinese Office Action dated Oct. 21, 2013 for Application No. 2011-80013842.5 with English Translation, 12 pages.
European Search Report dated Oct. 9, 2014 for European Appln. No. 11733119, 11 pages.
Mikko Tammi et al.: "Scalable superwideband extension for wideband coding", Acoustics, Speech and Signal Processing, 2009. ICASSP 2009, IEEE International Conference on, IEEE, Piscataway, NJ, USA, Apr. 19, 2009, pp. 161-164, XP031459191, ISBN: 978-1-4244-2353-8 *paragraphs [03.1], [03.2] *p. 2*.
European Search Report dated Feb. 2, 2016 for European Application No. 15002981, 10 pages.
"Draft new recommendation ITU-T G.718 Amendment 2 (ex G.718-SWB) Frame error robust narrowband and wideband embedded variable bit-rate coding of speech and audio from 8-32 kbits/s: New Annex B on superwideband scalable extension for G.718 and corrections to main body fixed-point C-code", ITU-T Draft: Study Period 2009-2012, International Telecommunication Union, Geneva; CH, vol. Study Group 16, Nov. 4, 2009, pp. 1-57, XP017450632.
Bessette et al., "The adaptive multirate wideband speech codec (AMR-WB)," IEEE Transactions on Speech and Audio Processing, Nov. 2002, 10(8):620-636, 17 pages.
Korean Notice of Allowance in Korean Application No. 10-2012-7020609, dated May 4, 2017. 4 pages (with English translation).

* cited by examiner

< Example of determining inter-frame similarity (tonality) >

FIG. 3
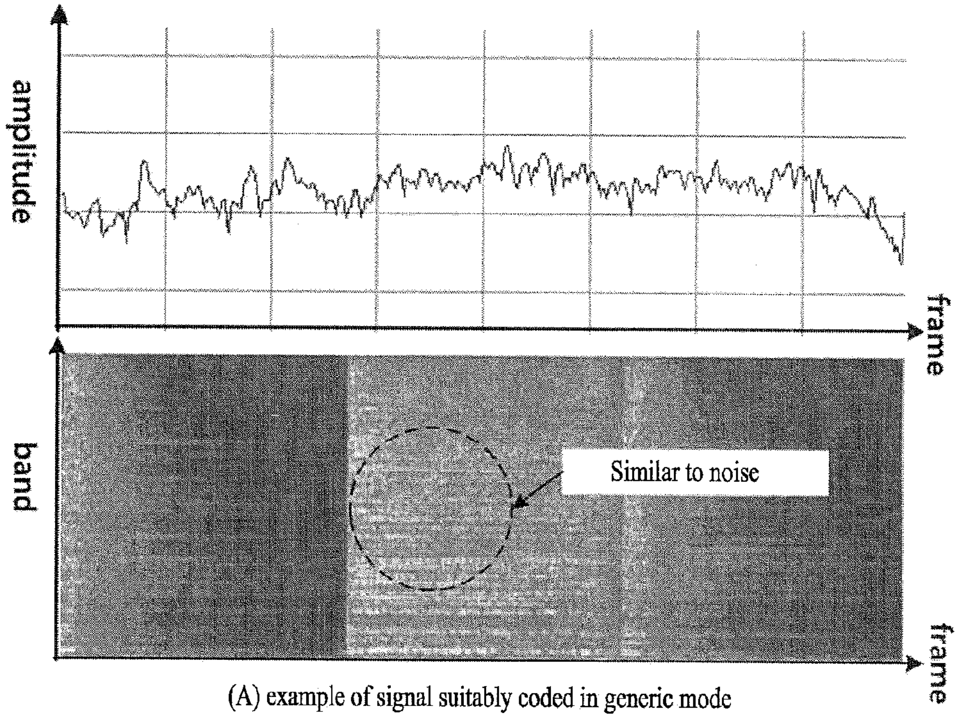
(A) example of signal suitably coded in generic mode
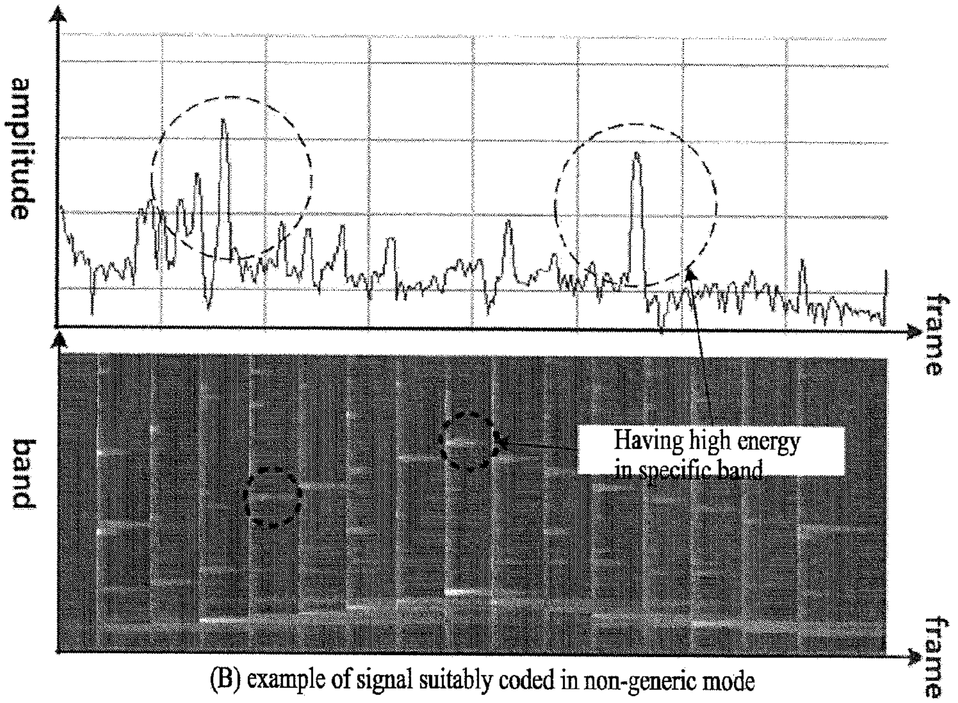
(B) example of signal suitably coded in non-generic mode

FIG. 5

| Description | Parameter | Bits, breakdown | Bits, total |
| --- | --- | --- | --- |
| | SWB / Stereo | 1 | 1 |
| First mode information | tonal/non-tonal | 1 | 1 |
| Second mode information | generic/non-generic | 1 | 1 |
| Envelope position information | Subband lags | 8 + 7 + 8 + 7 | 30 |
| Scaling information | Gain signs | 1 + 1 + 1 + 1 | 4 |
| | Gains, 1st scaling | 8 + 8 | 16 |
| | Gains, 2nd scaling | 8 | 8 |
| | Sinusoidal positions | 5 + 5 | 10 |
| | Sinusoidal signs | 1 | 1 |
| | Sinusoidal amplitudes | 4 + 4 | 8 |
| | Unused | 1 | 1 |

Example of syntax of generic mode

FIG. 11

| | Parameter | Bits, breakdown | Bits, total |
|---|---|---|---|
| | SWB / Stereo | 1 | 1 |
| First mode information | tonal/non-tonal | 1 | 1 |
| Second mode information | generic/non-generic | 1 | 1 |
| Noise position information | Subband lags | 3 + 2 + 2 + 2 | 9 |
| Pulse position information | Sinusoidal positions | 6 + 6 + 6 + 6 + 6 | 30 |
| Pulse sign information | Sinusoidal signs | 1 + 1 + 1 + 1 + 1 + 1 + 1 + 1 | 8 |
| Pulse amplitude information | Sinusoidal amplitudes | 8 + 8 | 16 |
| Pulse subband information | Subband position | 2 + 2 + 2 + 2 + 2 | 10 |
| Noise energy information | Subband average energy | 4 | 4 |
| | TOTAL | | 80 bits |

FIG. 12
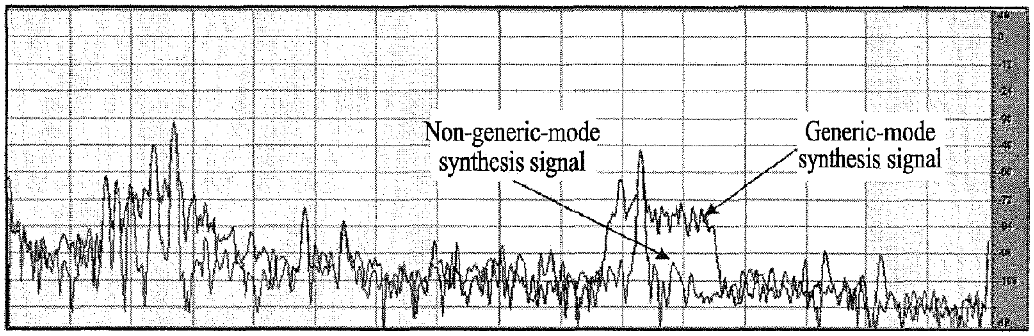
(A)
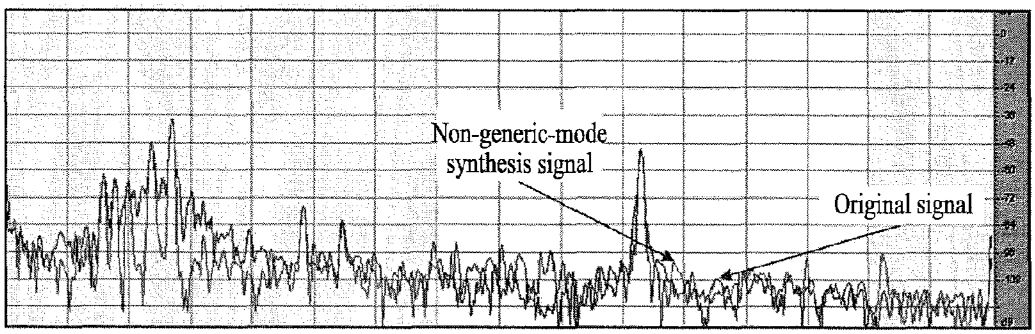
(B)

FIG. 17

| Track | Num of sinusoids | Starting position | Position step size | Length |
|---|---|---|---|---|
| 0 | 2 | 280 | 2 | 32 |
| 1 | 2 | 281 | 2 | 32 |
| 2 | 2 | 344 | 2 | 32 |
| 3 | 2 | 345 | 2 | 32 |
| 4 | 1 | 408 | 1 | 64 |
| 5 | 1 | 472 | 1 | 32 |

(A)

(B)

(C)

| Pitch | Harmonic | | Bit |
|---|---|---|---|
| First pitch 20 ~ 27 [3bit] | Start position of first harmonic track | 1~31(odd number)[4bit] | 7 bit |
| | Start position of second harmonic track | 2~32(even number)[4bit] | 4 bit |
| Second pitch 20 ~ 27 [3bit] | Start position of third harmonic track | 1~31(odd number)[4bit] | 7 bit |
| | Start position of fourth harmonic track | 2~32(even number)[4bit] | 4 bit |

| Pitch | Track | Starting position | Position step size | Length |
|---|---|---|---|---|
| 20-27 | 1 | 280 | 2 | 16 |
| | 2 | 281 | 2 | 16 |
| 20-27 | 3 | 280 | 2 | 16 |
| | 4 | 281 | 2 | 16 |

FIG. 21

| | Parameter | Bits, breakdown | Bits, total |
|---|---|---|---|
| | SWB / Stereo | 1 | 1 |
| First mode information | tonal/non-tonal | 1 | 1 |
| Second mode information | generic/non-generic | 1 | 1 |
| Pitch information (first pitch/second pitch) | Pitch extraction | 3 + 3 | 6 |
| Harmonic track information | Harmonic extraction | 4 + 4 + 4 + 4 | 16 |
| Harmonic start position information | Harmonic positions | 2 + 2 + 2 + 2 | 8 |
| Pulse amplitude information | Pulse amplitudes | 12 + 12 | 24 |
| | DCT coefficients | 23 | 23 |
| | TOTAL | | 80bits |

FIG. 25
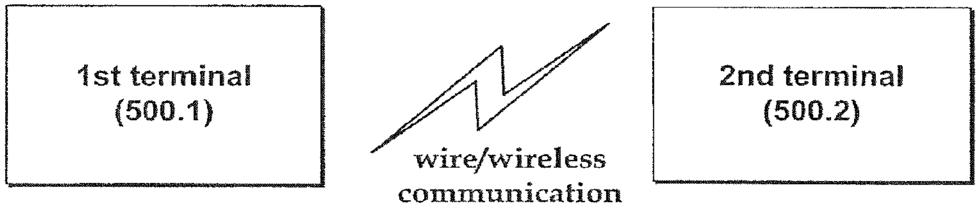
(A)
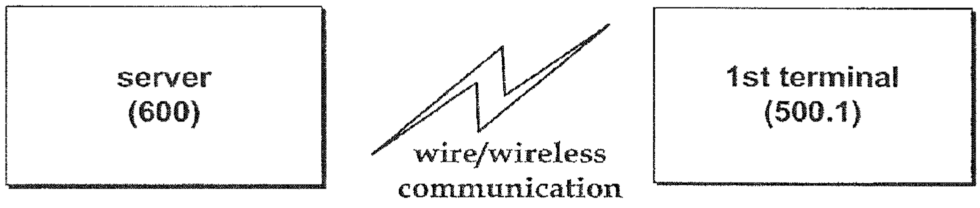
(B)

METHOD AND APPARATUS FOR PROCESSING AN AUDIO SIGNAL

CROSS REFERENCE TO RELATED APPLICATIONS

This application is a continuation of U.S. application Ser. No. 13/522,274, filed Nov. 7, 2012, now allowed, which is a U.S. National Phase application under 35 U.S.C. §371 of International Application PCT/KR2011/000324, filed on Jan. 17, 2011, which claims the benefit of U.S. Provisional Application No. 61/295,170, filed on Jan. 15, 2010, U.S. Provisional Application No. 61/349,192, filed on May 27, 2010, U.S. Provisional Application No. 61/377,448, filed on Aug. 26, 2010 and U.S. Provisional Application No. 61/426,502, filed on Dec. 22, 2010, the entire contents of which are hereby incorporated by reference in their entireties.

TECHNICAL FIELD

The present invention relates to an audio signal processing method and apparatus for encoding or decoding an audio signal.

BACKGROUND ART

In general, an audio signal includes signals having various frequencies. The audible frequency range of the human ear is 20 Hz to 20 kHz and human voice is generally in a range of about 200 Hz to 3 kHz.

In encoding of an audio signal having a high frequency band of 7 kHz or more in which human voice is not present, one of a plurality of coding modes or coding schemes is applicable according to audio properties.

DISCLOSURE

Technical Problem

If a coding mode or coding scheme which is not suitable for audio properties is applied, sound quality may be deteriorated.

Technical Solution

An object of the present invention is to provide an audio signal processing method and apparatus for separately encoding pulses of a signal having high energy in a specific frequency band, such as percussion sound.

Another object of the present invention is to provide an audio signal processing method and apparatus for separately encoding harmonic tracks of a signal having harmonics, such as a string sound.

Another object of the present invention is to provide an audio signal processing method and apparatus for applying a coding mode suitable for audio properties based on a pulse ratio and/or a harmonic ratio.

Advantageous Effects

The present invention provides the following effects and advantages.

First, in the signal having high energy in the specific frequency band, only pulses of the specific frequency band of the signal are separately encoded. Thus, a restoration ratio is higher than that of an encoding mode (generic mode) using only a low frequency band and thus sound quality can be remarkably improved.

Second, in a signal including harmonics, pulses corresponding to harmonics are not respectively encoded, but an overall harmonic track is encoded. Thus, it is possible to increase a restoration ratio without increasing the number of bits.

Third, by adaptively applying one of encoding and decoding schemes corresponding to a total of four modes according to audio properties of frames, it is possible to improve sound quality.

Fourth, in case of applying modified discrete cosine transform (MDCT), since a main pulse and sub pulse adjacent thereto are extracted in the light of the MDCT properties so as to accurately extract a pulse mapped to a specific frequency band, it is possible to increase performance of a non-generic-mode encoding scheme.

Fifth, by extracting and separately quantizing only a best pulse and pulses adjacent thereto from a plurality of harmonic tracks in a harmonic mode, it is possible to reduce the number of bits.

Sixth, in a harmonic mode, since a start position is set to one of a predetermined position with respect to a harmonic track belonging to one group having the same pitch, it is possible to reduce the number of bits in display of start positions of a plurality of harmonic tracks.

DESCRIPTION OF DRAWINGS

FIG. 3 is a diagram showing examples of a signal which is suitably coded in a generic mode or a non-generic mode.

FIG. 5 is a diagram showing an example of syntax in case of performing encoding in a generic mode.

FIG. 11 is a diagram showing an example of syntax in case of performing encoding in a non-generic mode.

FIG. 12 is a diagram showing the result of encoding a specific audio signal in a generic mode and a non-generic mode.

FIG. 17 is a diagram showing an example of syntax in case of performing encoding in a non-harmonic mode.

FIG. 21 is a diagram showing syntax in case of performing encoding in a harmonic mode.

FIG. 25 is a diagram showing a relationship between products in which an audio signal processing apparatus according to an embodiment of the present invention is implemented.

BEST MODE

Figure 1:
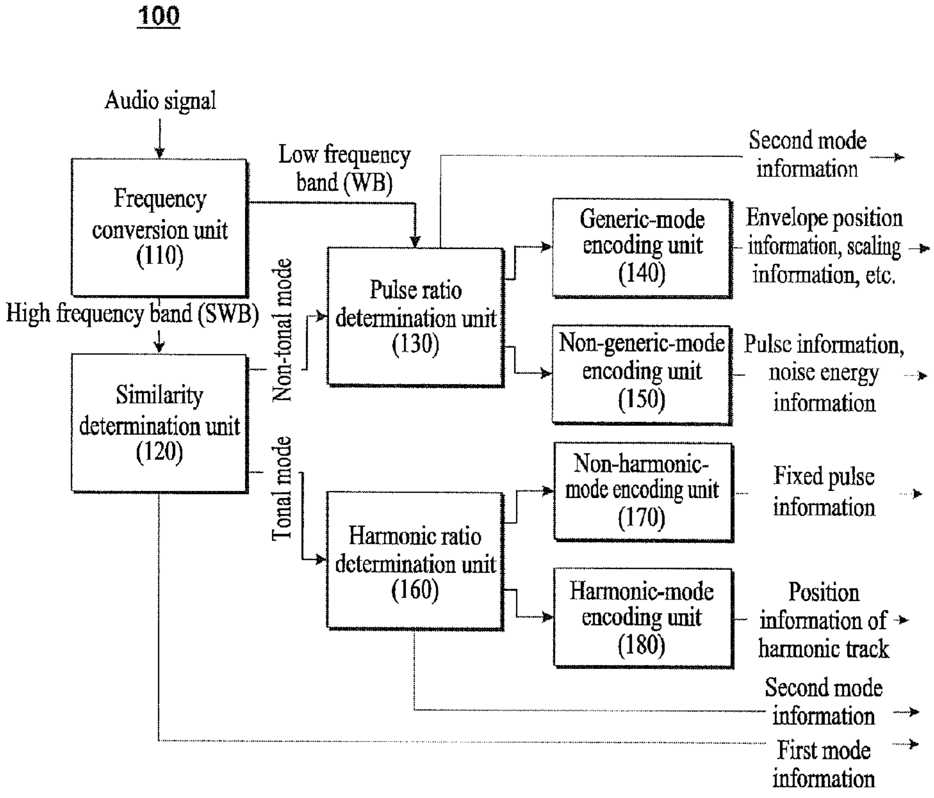
FIG. 1 is a diagram showing the configuration of an encoder of an audio signal processing apparatus according to an embodiment of the present invention.

According to an aspect of the present invention, there is provided an audio signal processing method including performing frequency conversion with respect to an audio signal so as to acquire a plurality of frequency-converted coefficients, selecting one of a generic mode and a non-generic mode based on a pulse ratio with respect to frequency-converted coefficients of a high frequency band among the plurality of frequency-converted coefficients, and, if the non-generic mode is selected, performing the following steps of extracting a predetermined number of pulses from the frequency-converted coefficients of the high frequency band and generating pulse information, generating an original noise signal excluding the pulses from the frequency-converted coefficients of the high frequency band, generating a reference noise signal using frequency-converted coefficients of a low frequency band among the plurality of frequency-converted coefficients, and generating noise position information and noise energy information using the original noise signal and the reference noise signal.

The pulse ratio may be a ratio of energy of a plurality of pulses to total energy of a current frame.

The extracting the predetermined number of pulses may include extracting a main pulse highest energy, extracting sub pulse adjacent to the main pulse, and excluding the main pulse and the sub pulse from the frequency-converted coefficients of the high frequency band so as to generate a target noise signal, and the extraction of the main pulse and the sub pulse is repeated predetermined times in order to generate the target noise signal.

The pulse information may include at least one of pulse position information, pulse sign information, pulse amplitude information and pulse subband information.

The generating the reference noise signal may include setting a threshold based on total energy of a low frequency band, and excluding pulses exceeding the threshold so as to generate the reference noise signal.

The generating the noise energy information may include generating energy of the predetermined number of pulses, generating energy of the original noise signal, acquiring a pulse ratio using the energy of the pulses and the energy of the original noise signal, and generating the pulse ratio as the noise energy information.

According to another aspect of the present invention, there is provided an audio signal processing apparatus including a frequency conversion unit configured to perform frequency conversion with respect to an audio signal so as to acquire a plurality of frequency-converted coefficients, a pulse ratio determination unit configured to select one of a generic mode and a non-generic mode based on a pulse ratio with respect to frequency-converted coefficients of a high frequency band among the plurality of frequency-converted coefficients, and a non-generic-mode encoding unit configured to operate in the non-generic mode and including a pulse extractor configured to extract a predetermined number of pulses from the frequency-converted coefficients of the high frequency band and to generate pulse information, a reference noise generator configured to generate a reference noise signal using frequency-converted coefficients of a low frequency band among the plurality of frequency-converted coefficients, and a noise search unit configured to generate noise position information and noise energy information using an original noise signal and the reference noise signal, wherein the original noise signal is generated by excluding the pulses from the frequency-converted coefficients of the high frequency band.

According to another aspect of the present invention, there is provided an audio signal processing method including receiving second mode information indicating whether a current frame is in a generic mode or a non-generic mode, receiving pulse information, noise position information and noise energy information if the second mode information indicates that the current frame is in the non-generic mode, generating a predetermined number of pulses with respect to frequency-converted coefficients using the pulse information, generating a reference noise signal using frequency-converted coefficients of a low frequency band corresponding to the noise position information, adjusting energy of the reference noise signal using the noise energy information, and generating frequency-converted coefficients corresponding to a high frequency band using the reference noise signal, the energy of which is adjusted, and the plurality of pulses.

According to another aspect of the present invention, there is provided an audio signal processing method including receiving an audio signal, performing frequency conversion with respect to the audio signal so as to acquire a plurality of frequency-converted coefficients, selecting one of a non-harmonic mode and a harmonic mode based on a harmonic ratio with respect to the frequency-converted coefficients, and, if the harmonic mode is selected, performing the following steps of deciding harmonic tracks of a first group corresponding to a first pitch, deciding harmonic tracks of a second group corresponding to a second pitch, and generating start position information of the plurality of harmonic tracks, wherein the harmonic tracks of the first group include a first harmonic track and a second harmonic track, wherein the harmonic tracks of the second group include a third harmonic track and a fourth harmonic track, wherein start position information of the first harmonic track and the third harmonic track corresponds to one of a first position set, and wherein start position information of the second harmonic track and the fourth harmonic track corresponds to one of a second position set.

The harmonic ratio may be generated based on energy of the plurality of harmonic tracks and energy of the plurality of pulses.

The first position set may correspond to even number positions and the second position set may correspond to odd number positions.

The audio signal processing method may further include generating a first target vector including a best pulse and pulses adjacent thereto in the first harmonic track and a best pulse and pulses adjacent thereto in the second harmonic track, generating a second target vector including a best pulse and pulses adjacent thereto in the third harmonic track and a best pulse and pulses adjacent thereto in the fourth harmonic track, vector-quantizing the first target vector and the second target vector, and performing frequency conversion with respect to a residual part excluding the first target vector and the second target vector from the harmonic tracks.

The first harmonic track may be a set of a plurality of pulses having a first pitch, the second harmonic track may be a set of a plurality of pulses having a first pitch, the third harmonic track may be a set of a plurality of pulses having a second pitch, and the fourth harmonic track may be a set of a plurality of pulses having a second pitch.

The audio signal processing method may further include generating pitch information indicating the first pitch and the second pitch.

According to another aspect of the present invention, there is provided an audio signal processing method including receiving start position information of a plurality of harmonic tracks including harmonic tracks of a first group corresponding to a first pitch and harmonic tracks of a second group corresponding to a second pitch, generating a plurality of harmonic tracks corresponding to the start position information, and generating an audio signal corresponding to a current frame using the plurality of harmonic tracks, wherein the harmonic tracks of the first group include a first harmonic track and a second harmonic track, wherein the harmonic tracks of the second group include a third harmonic track and a fourth harmonic track, wherein start position information of the first harmonic track and the third harmonic track corresponds to one of a first position set, and wherein start position information of the second harmonic track and the fourth harmonic track corresponds to one of a second position set.

According to an aspect of the present invention, there is provided an audio signal processing method including performing frequency conversion with respect to an audio signal so as to acquire a plurality of frequency-converted coefficients, selecting a non-tonal mode and a tonal mode based on inter-frame similarity with respect to the frequency-converted coefficients, selecting one of a generic mode and a non-generic mode based on a pulse ratio if the non-tonal mode is selected, selecting one of a non-harmonic mode and a harmonic mode based on a harmonic ratio if the tonal mode is selected, and encoding the audio signal according to the selected mode so as to generate a parameter, wherein the parameter includes envelope position information and scaling information in the generic mode, wherein the parameter includes pulse information and noise energy information in the non-generic mode, wherein the parameter includes fixed pulse information which is information about fixed pulses, the number of which is predetermined per subband, in the non-harmonic mode, and wherein the parameter includes position information of harmonic tracks of a first group and position information of harmonic tracks of a second group in the harmonic mode.

The audio signal processing method may further include generating first mode information and second mode information according to the selected mode, the first mode information may indicate one of the non-tonal mode and the tonal mode, and the second mode information may indicate one of the generic mode or the non-generic mode if the first mode information indicates the non-tonal mode and indicate one of the non-harmonic mode and the harmonic mode if the first mode information indicates the tonal mode.

According to another aspect of the present invention, there is provided an audio signal processing method including extracting first mode information and second mode information through a bitstream, deciding a current mode corresponding to a current frame based on the first mode information and the second mode information, restoring an audio signal of the current frame using envelope position information and scaling information if the current mode is a generic mode, restoring the audio signal of the current frame using pulse information and noise energy information if the current mode is a non-generic mode, restoring the audio signal of the current frame using fixed pulse information which is information about fixed pulses, the number of which is predetermined per subband, if the current mode is a non-harmonic mode, and restoring the audio signal of the current frame using position information of harmonic tracks of a first group and position information of harmonic tracks of a second group if the current mode is a harmonic mode.

MODE FOR INVENTION

Hereinafter, the exemplary embodiments of the present invention will be described in detail with reference to the accompanying drawings. The terms used in the present specification and claims are not limited to general meanings thereof and are construed as meanings and concepts suiting the technical spirit of the present invention based on the rule of appropriately defining the concepts of the terms in order to illustrate the invention in the best way possible. The embodiments described in the present specification and the configurations shown in the drawings are merely exemplary and various modifications and equivalents thereof may be made.

In the present invention, the following terms may be construed based on the following criteria and the terms which are not used herein may be construed based on the following criteria. The term coding may be construed as encoding or decoding and the term information includes values, parameters, coefficients, elements, etc. and the meanings thereof may be differently construed according to circumstances and the present invention is not limited thereto.

The term audio signal is differentiated from the term video signal in a broad sense and refers to a signal which is audibly identified upon playback and is differentiated from a speech signal in a narrow sense and refers to a signal in which a speech property is not present or is few. In the present invention, the audio signal is construed in a broad sense and is construed as an audio signal having a narrow sense when used to be differentiated from the speech signal.

The term coding may refer to only encoding or may include encoding and decoding.

FIG. 1 is a diagram showing the configuration of an encoder of an audio signal processing apparatus according to an embodiment of the present invention. The encoder 100 according to the embodiment includes at least one of a pulse ratio determination unit 130, a harmonic ratio determination unit 160, a non-generic-mode encoding unit 150 and a harmonic-mode encoding unit 180 and may further include at least one of a frequency conversion unit 110, a similarity (tonality) determination unit 120, a generic-mode encoding unit 140 and a non-harmonic-mode encoding unit 180.

In summary, there is a total of four coding modes: 1) a generic mode, 2) a non-generic mode, 3) a non-harmonic mode and 4) a harmonic mode. 1) The generic mode and 2)

the non-generic mode correspond to a non-tonal mode and 3) the non-harmonic mode and 4) the harmonic mode correspond to a tonal mode.

A determination as to whether the non-tonal mode or the tonal mode is applied is made by the similarity determination unit 120 according to inter-frame similarity. That is, if similarity is not high, the non-tonal mode is applied and, if similarity is high, the tonal mode is applied. In case of the non-tonal mode, the pulse ratio determination unit 130 determines that 1) the generic mode is applied if a pulse ratio (a ratio of energy of a pulse to total energy) is high and determines that 2) the non-generic mode is applied if the pulse ratio is low.

In addition, in the tonal mode, the harmonic ratio determination unit 160 determines that 3) the non-harmonic mode is applied if a harmonic ratio (a ratio of energy of a harmonic track to energy of a pulse) is not high and that 4) the harmonic mode is applied if the harmonic ratio is high.

The frequency conversion unit 110 performs frequency conversion with respect to an input audio signal so as to acquire a plurality of frequency-converted coefficients. A Modified Discrete Cosine Transform (MDCT) method, a Fast Fourier Transform (FFT) method, etc. may be applied for frequency conversion, but the present invention is not limited thereto.

The frequency-converted coefficients include frequency-converted coefficients corresponding to a relatively low frequency band and frequency-converted coefficients corresponding to a high frequency band. The frequency-converted coefficient of the low frequency band is referred to as a wide band signal, a WB signal or a WB coefficient and the frequency-converted coefficient of the high frequency band is referred to as a super wide band signal, a SWB signal or a WB coefficient. A criterion for dividing the low frequency band and the high frequency band may be about 7 kHz, but the present invention is not limited to a specific frequency.

If the MDCT method is used as the frequency conversion method, a total of 640 frequency-converted coefficients may be generated with respect to an entire audio signal. At this time, about 280 coefficients corresponding to a lowest band may be referred to as a WB signal and about 280 coefficients corresponding to a next band may be referred to as an SWB signal. However, the present invention is not limited thereto.

The similarity determination unit 120 determines inter-frame similarity with respect to an input audio signal. Inter-frame similarity relates to how much the spectrum of the frequency-converted coefficients of a current frame is similar to that of the frequency-converted coefficients of a previous frame. Inter-frame similarity may be referred to as tonality. The description of an equation for inter-frame similarity will be omitted.

Figure 2:
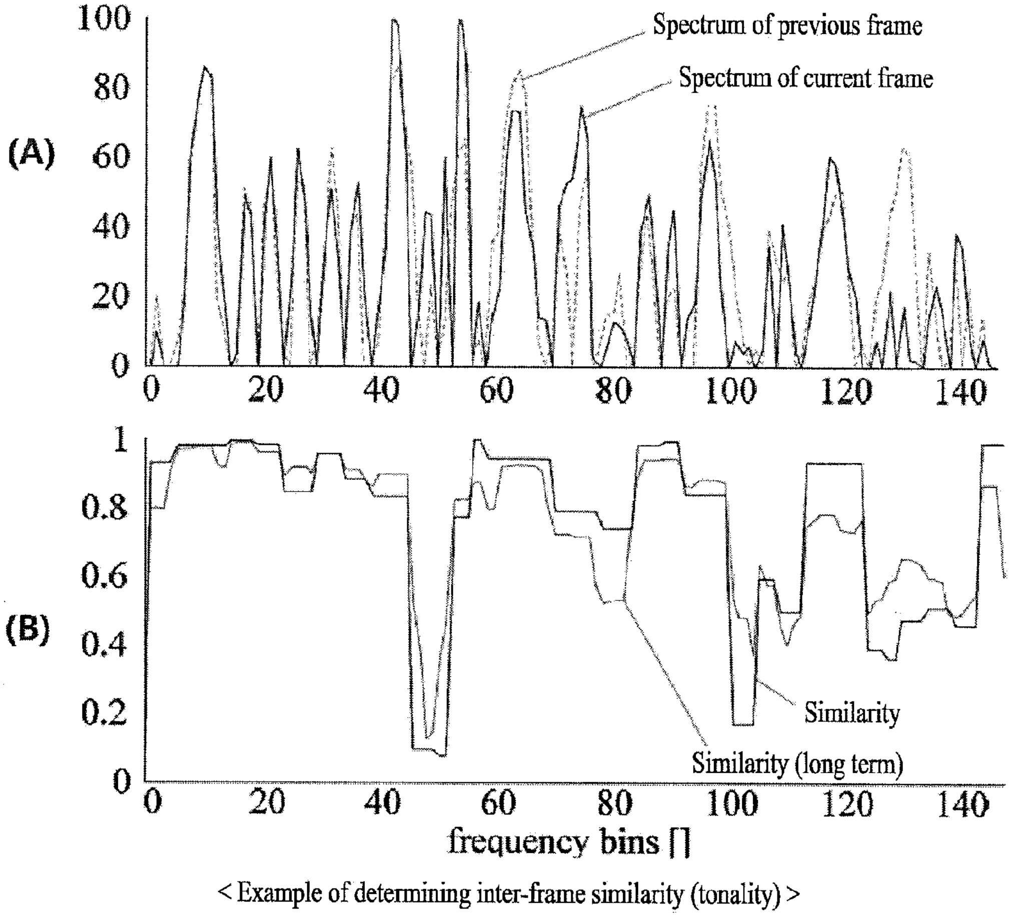
FIG. 2 is a diagram illustrating an example of determining inter-frame similarity (tonality).

FIG. 2 is a diagram illustrating an example of determining inter-frame similarity (tonality). FIG. 2(A) shows an example of the spectrum of a previous frame and the spectrum of a current frame. It can be intuitively seen that similarity is lowest in frequency bins of about 40 to 60. It can be seen from FIG. 2(B) that similarity is lowest in the frequency bins of about 40 to 60, similarly to the intuitive result.

As the result of determining inter-frame similarity via the similarity determination unit 120, a low-similarity signal is similar to noise and corresponds to a non-tonal mode and a high-similarity signal is different from noise and corresponds to a tonal mode. First mode information indicating whether a frame corresponds to a non-tonal mode or a tonal mode is generated and sent to a decoder.

If it is determined that the frame corresponds to the non-tonal mode (e.g., if the first mode information is 0), the frequency-converted coefficients of the high frequency band are sent to the pulse ratio determination unit 130 and, if it is determined that the frame corresponds to the tonal mode (e.g., if the first mode information is 1), the coefficients are sent to the harmonic ratio determination unit 160.

Referring to FIG. 1 again, if inter-frame similarity is low, that is, in case of the non-tonal mode, the pulse ratio determination unit 130 is activated.

The pulse ratio determination unit 130 determines a generic mode or a non-generic mode based on a ratio of energy of a plurality of pulses to total energy of a current frame. The term pulse refers to a coefficient having relatively high energy in a domain (e.g., an MDCT domain) of a frequency-converted coefficient.

FIG. 3 is a diagram showing examples of a signal which is suitably coded in a generic mode or a non-generic mode. Referring to FIG. 3(A), it can be seen that the signal does not include only a specific frequency band but includes all frequency bands. The signal has a property similar to noise can be suitably coded in the generic mode. Referring to FIG. 3(B), it can be seen that the signal does not include all frequency bands but has high energy in a specific frequency band (line). The specific frequency band may appear as a pulse in a domain of a frequency-converted coefficient. If the energy of this pulse is higher than total energy, a pulse ratio is high and thus this signal can be suitably encoded in the non-generic mode. The signal shown in FIG. 3(A) may be close to noise and the signal shown in FIG. 3(*b*) may be close to percussion sound.

Since a process of extracting pulses having high energy from a domain of a frequency-converted coefficient by the pulse ratio determination unit 130 may be equal to a pulse extraction process performed when a coding method of a non-generic mode is applied, the detailed configuration of the non-generic-mode encoding unit 150 will be described below.

If a total of eight pulses is extracted, this may be expressed as follows.

$$P(j)=\max(\{M_{32}(k+280)\}^2), j=0, \ldots, 7\ k=280, \ldots, 560 \quad \text{[Equation 1]}$$

where, $M_{32}(k)$ are an SWB coefficient (a frequency-converted coefficient of a high frequency band), k is an index of a frequency-converted coefficient, P(j) is a pulse (or a peak), and j is a pulse index.

The pulse ratio may be expressed by the following equation.

$$R_{peak8} = \frac{E_{peak}}{E_{total}} \quad \text{[Equation 2]}$$

where, $$E_{peak} = \sum_{k=0}^{7} \{P(k)^2\} \text{ and } E_{total} = \sum_{k=0}^{280} \{P(k+280)^2\}.$$

where, $R_{peak8}$ is a pulse ratio, $E_{peak}$ is the total energy of a pulse, and $E_{total}$ is total energy.

If the pulse ratio does not exceed a specific reference value (e.g., 0.6) after the pulse ratio $R_{peak8}$ is estimated, the signal is determined as the generic mode and, if the pulse ratio exceeds the reference value, the signal is determined as the non-generic mode.

Referring to FIG. 1 again, the pulse ratio determination unit 130 determines the generic mode or the non-generic mode based on the pulse ratio through the above process and generates and transmits second mode information indicating the generic mode or the non-generic mode in the non-tonal mode to the decoder. The detailed configuration of the generic-mode encoding unit 140 and the detailed configuration of the non-generic mode encoding unit 150 will be described with reference to other drawings.

The detailed configurations of the harmonic ratio determination unit 160, the non-harmonic-mode encoding unit 170 and the harmonic-mode encoding unit 180 will be described with reference to other drawings.

Figure 4:
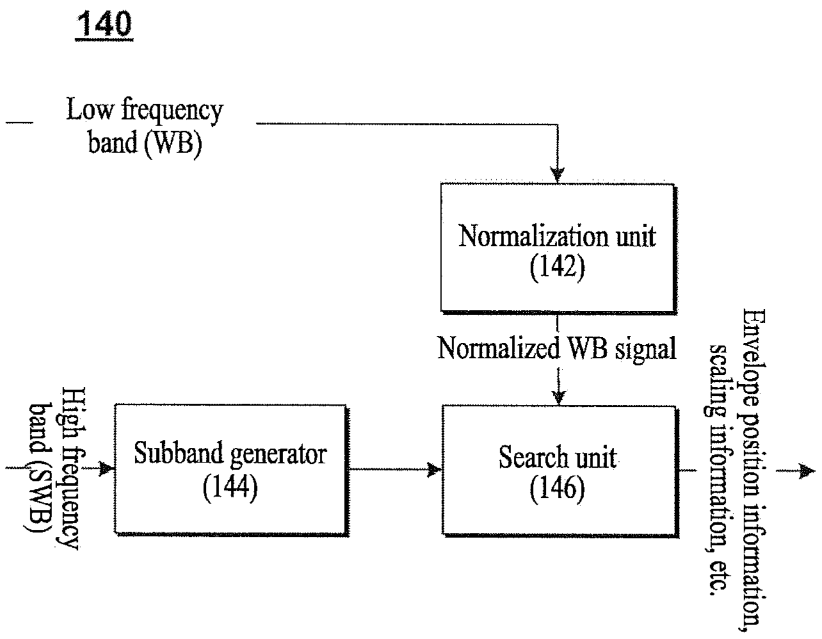
FIG. 4 is a diagram showing the detailed configuration of a generic-mode encoding unit 140.

FIG. 4 is a diagram showing the detailed configuration of the generic-mode encoding unit 140, and FIG. 5 is a diagram showing an example of syntax in case of performing encoding in the generic mode.

First, referring to FIG. 4, the generic-mode encoding unit 140 includes a normalization unit 142, a subband generator 144 and a search unit 146. In the generic mode, a high frequency band signal (SWB signal) is encoded using similarity with an envelope of an encoded low frequency band signal (WB signal).

The normalization unit 142 normalizes the envelope of the WB signal in a logarithmic domain. Since the WB signal should be confirmed even by a decoder, the WB signal is preferably a signal restored using the encoded WB signal. Since the envelope of the WB signal is rapidly changed, quantization of two scaling factors cannot be accurately performed and thus a normalization process in the logarithmic domain may be necessary.

The subband generator 144 divides the SWB signal into a plurality (e.g., four) of subbands. For example, if the total number of frequency-converted coefficients of the SWB signal is 280, the subbands may have 40, 70, 70 and 100 coefficients, respectively.

The search unit 146 searches the normalized envelope of the WB signal so as to calculate similarity with each subband of the SWB signal and determines a best similar WB signal having an envelope section similar to each subband based on the similarity. A start position of the best similar WB signal is generated as envelope position information.

Then, the search unit 146 may determine two pieces of scaling information in order to make the best similar WB signal audibly similar to an original SWB signal. At this time, first scaling information may be determined per subband in a linear domain and may be determined per subband in the logarithmic domain.

The generic-mode encoding unit 140 encodes the SWB signal using the envelope of the WB signal and generates envelope position information and scaling information.

Referring to FIG. 5, as an example of the syntax in case of the generic mode, 1-bit first mode information indicating whether the SWB signal is in the non-tonal mode or the tonal mode and 1-bit second mode information indicating whether the SWB signal is in the generic mode or the non-generic mode if the SWB signal is in the generic mode are allocated. The envelope position information of a total of 30 bits may be allocated to each subband.

As the scaling information, per-subband scaling sign information of a total of 4 bits, (a total of four pieces of) first per-subband scaling information of a total of 16 bits may be allocated and a total of four pieces of second per-subband scaling information are vector-quantized based on an 8-bit codebook and second per-subband scaling information of a total of 8 bits may be allocated. However, the present invention is not limited thereto.

Figure 6:
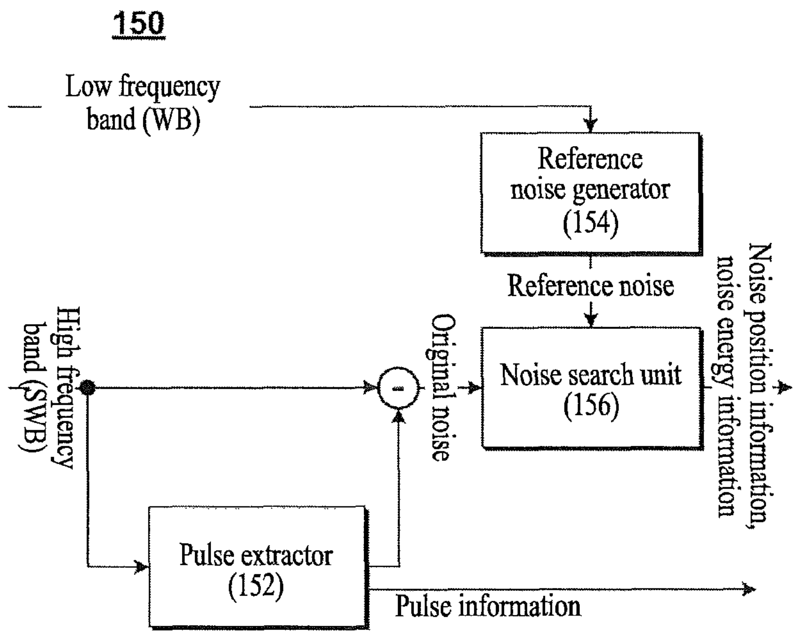
FIG. 6 is a diagram showing the detailed configuration of a non-generic-mode encoding unit 150.

Hereinafter, the encoding process in the non-generic mode will be described with reference to FIG. 6 and the subsequent figures thereof. FIG. 6 is a diagram showing the detailed configuration of the non-generic-mode encoding unit 150. Referring to FIG. 6, the non-generic-mode encoding unit 150 includes a pulse extractor 152, a reference noise generator 154 and a noise search unit 156.

The pulse extractor 152 extracts a predetermined number of pulses from the frequency-converted coefficients (SWB signal) of the high frequency band and generates pulse information (e.g., pulse position information, pulse sign information, pulse amplitude information, etc.). This pulse is similar to the pulse defined in the above-described pulse ratio determination unit 130. Hereinafter, an embodiment of a pulse extraction process will be described in detail with reference to FIGS. 7 to 9.

First, the pulse extractor 152 divides the SWB signal into a plurality of subband signals as follows. At this time, each subband may correspond to a total of 64 frequency-converted coefficients.

$$M_{32}^{0}(k)=M_{32}(k=280),k=0,\ldots,63$$

$$M_{32}^{1}(k)=M_{32}(k=344),k=0,\ldots,63$$

$$M_{32}^{2}(k)=M_{32}(k=408),k=0,\ldots,63$$

$$M_{32}^{3}(k)=M_{32}(k=472),k=0,\ldots,63 \quad \text{[Equation 3]}$$

$M_{32}^{0}(k)$ is a first subband of the SWB signal.

Then, per-subband energy is calculated as follows.

[Equation 4]

$$E^0=\sum_{k=0}^{63}\{M_{32}(k+280)\}^2$$

$$E^1=\sum_{k=0}^{63}\{M_{32}(k+344)\}^2$$

$$E^2=\sum_{k=0}^{63}\{M_{32}(k+408)\}^2$$

$$E^3=\sum_{k=0}^{63}\{M_{32}(k+472)\}^2.$$

$E^0$ is energy of the first subband.

Figure 7:
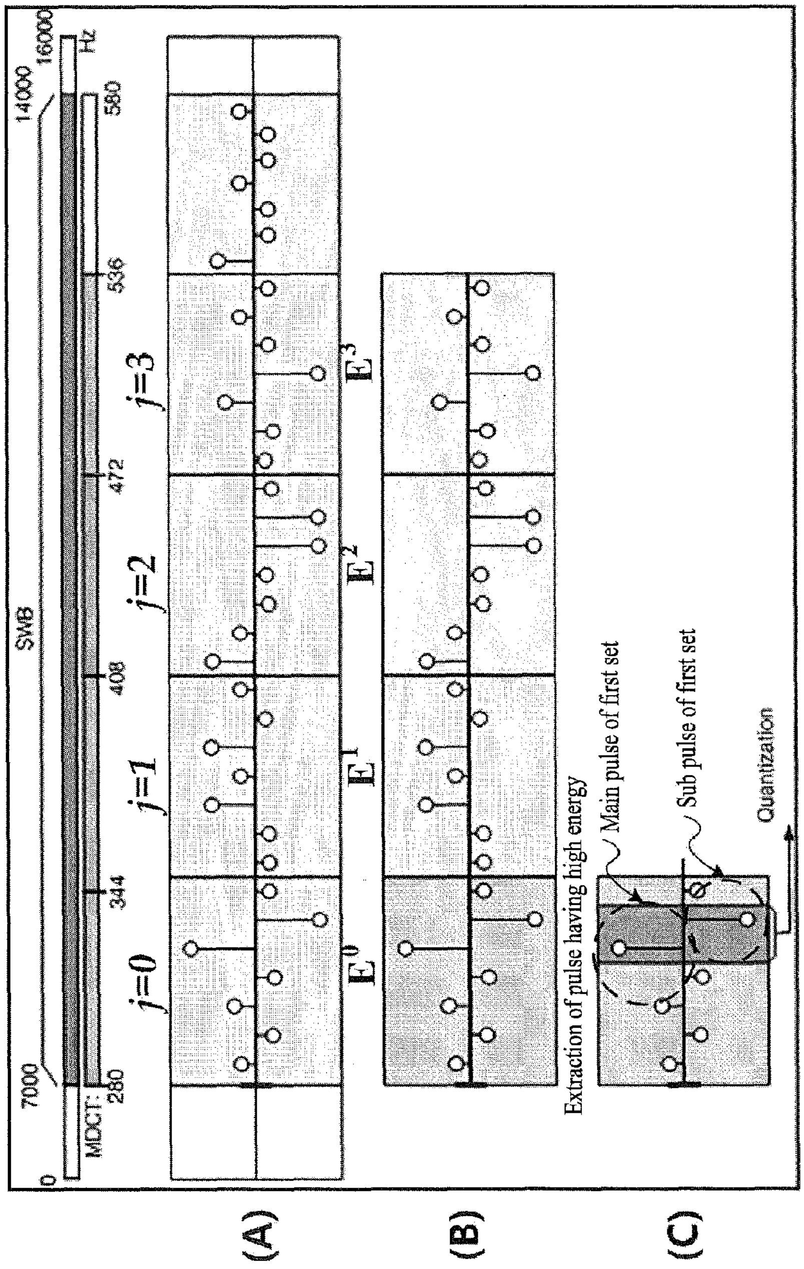
FIGS. 7 and 8 are diagrams illustrating a pulse extraction process.
Figure 8:
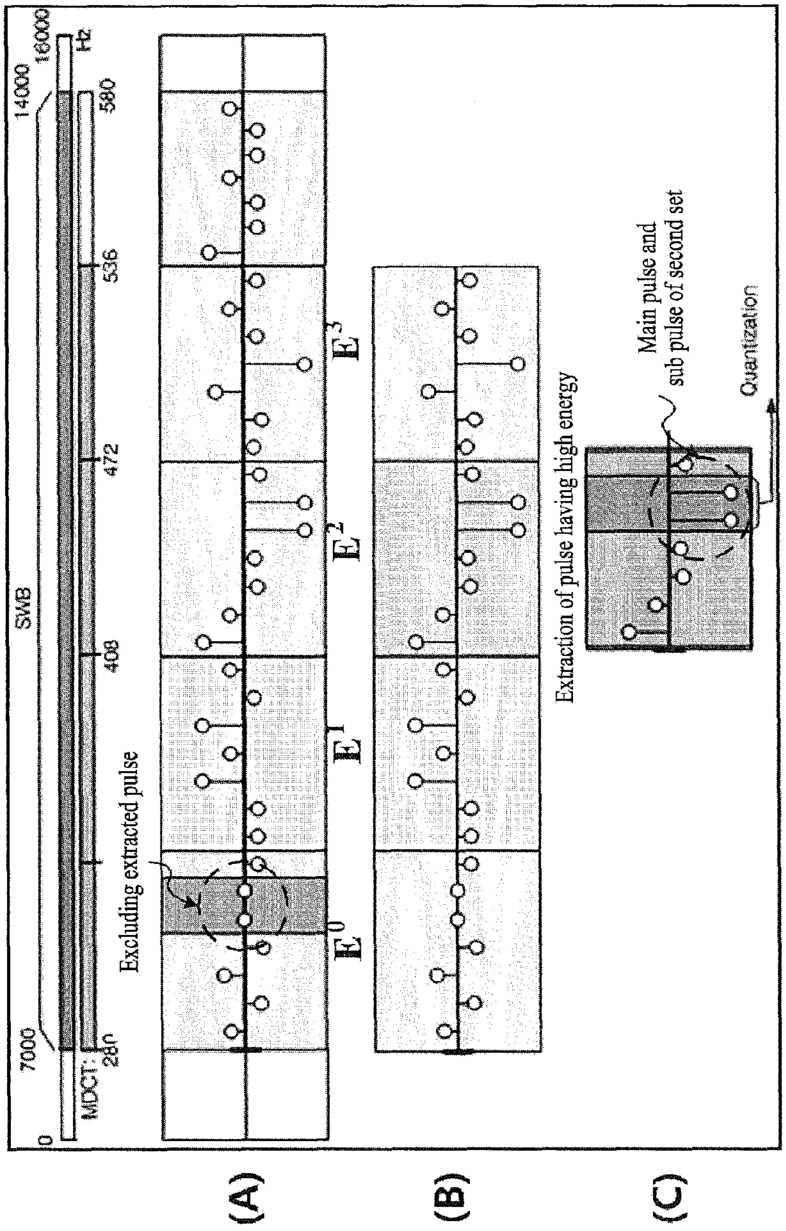

FIGS. 7 and 8 are diagrams illustrating a pulse extraction process. First, referring to FIG. 7(A), a total of four subbands is present in an SWB and an example of a pulse of each subband is shown.

Then, any one of subbands (j is any one of 0, 1, 2 and 3) respectively having highest energy $E^0$, $E^1$, $E^2$ and $E^3$ is selected. Referring to FIG. 7(B), an example in which the energy $E^0$ of a first subband is highest and thus the first subband (j=0) is selected is shown.

Then, a pulse having highest energy in the subband is set as a main pulse. Then, between two pulses adjacent to the main pulse, that is, between left and right pulses of the main pulse, a pulse having high energy is set as a sub pulse. Referring to FIG. 7(C), an example of setting the main pulse and the sub pulse in the first subband is shown.

In particular, a process of extracting the main pulse and the sub pulse adjacent thereto is preferable when the frequency-converted coefficients are generated through MDCT. This is because MDCT is sensitive to time shift and has phase-variant. Accordingly, since frequency resolution is not accurate, one specific frequency may not correspond to one MDCT coefficient and may correspond to two or more MDCT coefficients. Accordingly, in order to more accurately extract a pulse from an MDCT domain, only the main pulse of the MDCT is not extracted, but the sub pulse adjacent thereto is additionally extracted.

Since the sub pulse is adjacent to the left side or the right side of the main pulse, the position information of the sub pulse can be encoded using only 1 bit indicating the left side or the right side of the main pulse and the pulse can be more accurately estimated using a relatively small number of bits.

The process of extracting the main pulse and the sub pulse is logically summarized as follows. The present invention is not limited to the following expression.

```
    M32^max(k) = subband of maxium Energy
    index = peak position in subband M32^max
if (index == 0 or |M32^max(index - 1)| < |M32^max(index + 1)|)
        P_pos (1) = index + 1
        P_amp (1) = |M32^max(index + 1)|
            if (P_amp (1) < 0)
                P_sign (1) = 1
            else
                P_sign (1) = 0
else
        P_pos (1) = index - 1
        P_amp (1) = |M32^max(index - 1)|
            if(P_amp (1) < 0)
                P_sign (1) = 1
            else
                P_sign (1) = 0
```

The pulse extractor 152 excludes the main pulse and the sub pulse of the first set extracted from the SWB signal so as to generate a target noise signal.

Referring to FIG. 8(A), it can be seen that the pulses of the first set extracted in FIG. 7(C) are excluded. The process of extracting the main pulse and the sub pulse is repeated with respect to the target noise signal. That is, a subband having highest energy is set, a pulse having highest energy in the subband is set as a main pulse and one of pulses adjacent to the main pulse is set as a sub pulse. By excluding the main pulse and the sub pulse of the second set extracted in the above process and defining a target noise signal again, this process is repeated up to an N-th set. For example, the above process may be repeated up to the third set and two separate pulses may be further extracted from a target noise signal excluding the third set. The separate pulse refers to a pulse having highest energy in the target noise signal regardless of the main pulse and the sub pulse.

The pulse extractor 152 extracts the predetermined number of pulses as described above and then generates information about the pulses. Although the total number of pulses may be for example eight (a total of three sets of main pulses and sub pulses and a total of three separate pulses), the present invention is not limited thereto. The information about the pulses may include at least one of pulse position information, pulse sign information, pulse amplitude information and pulse subband information. The pulse subband information indicates to which subband the pulse belongs.

FIG. 11 is a diagram showing an example of syntax in case of performing encoding in a non-generic mode, in which only information about the pulses is referred to. FIG. 11 shows the case in which the total number of subbands is 4 and the total number of pulses is 8 (three main pulses, three sub pulses and two separate pulses). In case of pulse subband information of FIG. 11, two bits are necessary to express one pulse and thus a total of 10 bits is allocated. If the total number of subbands is 4, 2 bits are necessary to express one pulse. Since the main pulse and the sub pulse of each set belong to the same subband, only a total of 2 bits is consumed to express one set (the main pulse and the sub pulse). However, in case of the separate pulse, 2 bits are consumed to express one pulse.

Accordingly, in order to encode the pulse subband information, 2 bits are necessary to express a first set, 2 bits are necessary to express a second set, 2 bits are necessary to express a third set, 2 bits are necessary to express a first separate pulse and 2 bits are necessary to express a second separate pulse. That is, a total of 10 bits is necessary.

In addition, since the pulse position information indicates in which coefficient a pulse is present in a specific subband, 6 bits are consumed for each of the first to third sets, 6 bits are consumed for the first separate pulse and 6 bits are consumed for the second separate pulse. That is, a total of 30 bits is consumed.

In the pulse sign information, 1 bit is consumed for each pulse, that is, a total of 8 bits is consumed. A total of 16 bits is allocated to the pulse amplitude information by vector-quantizing the amplitude information of four pulses using an 8-bit codebook.

Figure 9:
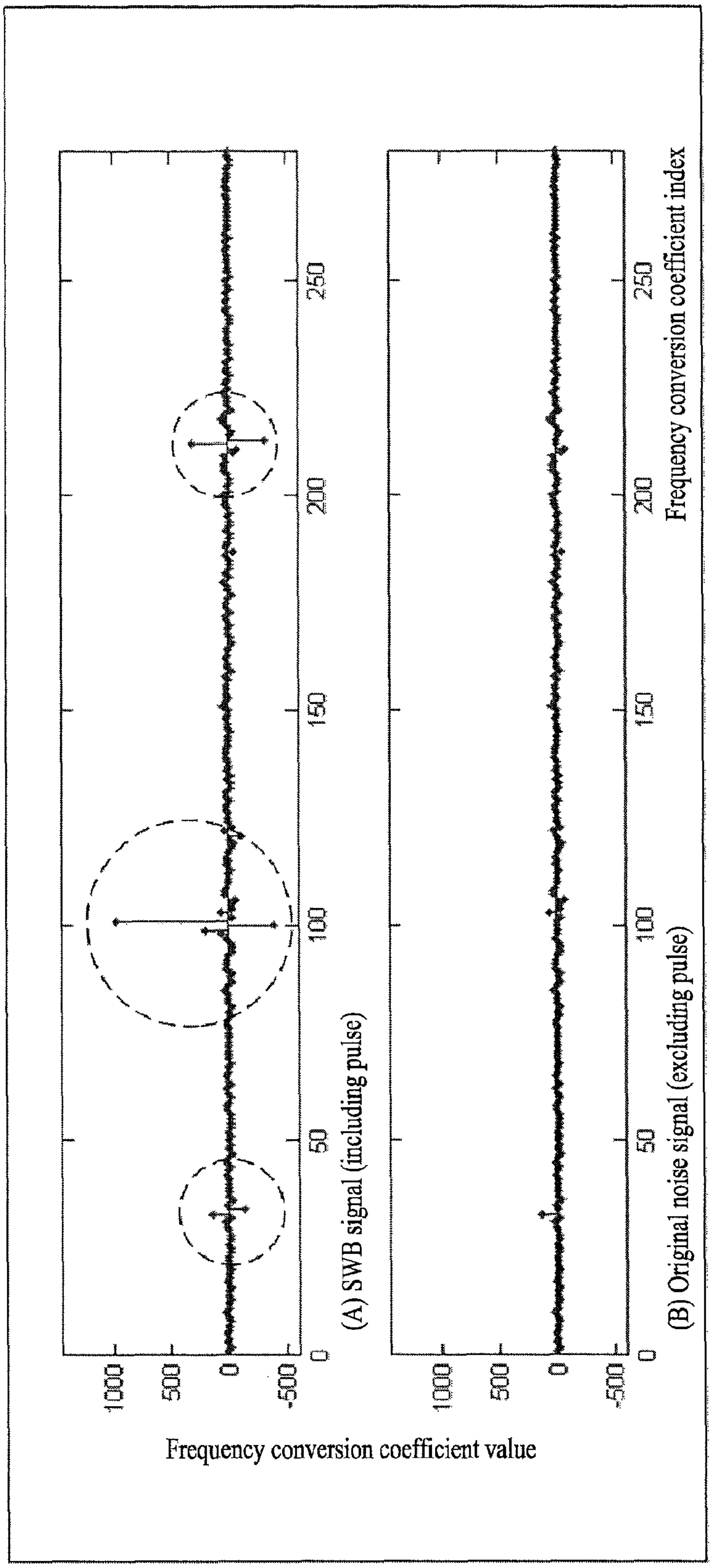
FIG. 9 is a diagram showing an example of a signal before pulse extraction (an SWB signal) and a signal after pulse extraction (an original noise signal).

Referring to FIG. 6 again, an original noise signal ($\tilde{M}_{32}^{0}$(k), etc.) is generated by excluding the pulses extracted by the pulse extractor 152 through the above process from the signal (SWB signal) of the high frequency band. For example, if coefficients corresponding to a total of 8 pulses are excluded from a total of 280 coefficients, the original noise signal may correspond to a total of 272 coefficients. FIG. 9 shows an example of a signal before pulse extraction (SWB signal) and a signal after pulse extraction (original noise signal). In FIG. 9(A), the original SWB signal includes a plurality of pulses each having high peak energy in a frequency conversion coefficient domain. However, in FIG. 9(*b*), only a noise-like signal excluding the pulses remains.

The reference noise generator 154 of FIG. 6 generate a reference noise signal based on a frequency conversion coefficient (WB signal) of a low frequency band. More specifically, a threshold is set based on the total energy of the WB signal and pulses having energy equal to or greater than the threshold are excluded so as to generate the reference noise signal.

Figure 10:
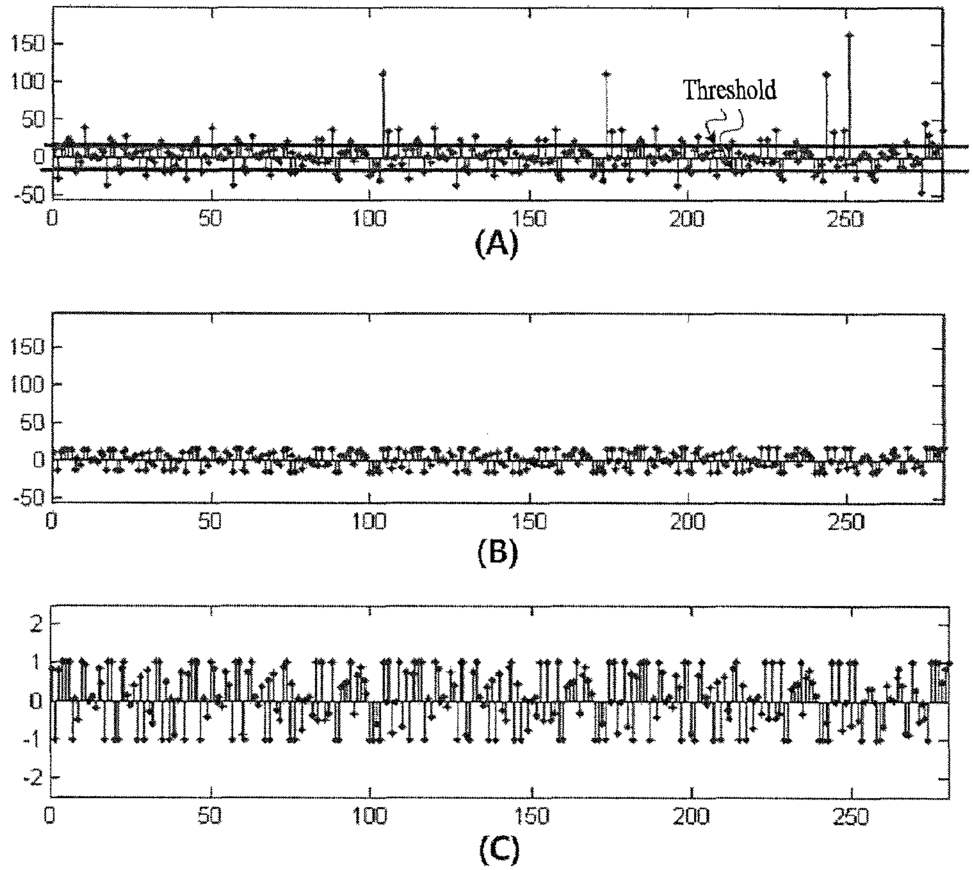
FIG. 10 is a diagram illustrating a reference noise generation process.

FIG. 10 is a diagram illustrating a process of generating a reference noise signal. Referring to FIG. 10(A), an example of a WB signal is shown on a frequency conversion domain. When a threshold is set in the light of total energy, there are pulses present outside the threshold range and there are pulses present inside the threshold range. If the pulses which are present outside the threshold range are excluded, the signal shown in FIG. 10(B) remains. After the reference noise signal is generated, a normalization process is performed. Then, an expression shown in FIG. 10(C) is obtained.

The reference noise generator 154 generates a reference noise signal $\tilde{M}_{16}$ using the WB signal through the above process.

The noise search unit 156 of FIG. 6 compares the original noise signal and the reference noise signal $\tilde{M}_{16}$ so as to set a section of the reference noise signal most similar to the original noise signal ($\tilde{M}_{32}^{0}$(k), etc.) and generates noise position information and noise energy information. An embodiment of this process will be described in detail below.

First, the original noise signal (the signal obtained by excluding the pulses from the SWB signal) is divided into a plurality of subband signals as follows.

$$\tilde{M}_{32}^{0}(k)=\tilde{M}_{32}(k=280), k=0, \ldots, 39$$

$$\tilde{M}_{32}^{1}(k)=\tilde{M}_{32}(k=320), k=0, \ldots, 69$$

$$\tilde{M}_{32}^{2}(k)=\tilde{M}_{32}(k=390), k=0, \ldots, 69$$

$$\tilde{M}_{32}^{3}(k)=\tilde{M}_{32}(k=460), k=0, \ldots, 99 \quad \text{[Equation 5]}$$

The size of each subband may be the same as the above-described subband in the generic mode. The length $d^j(k)$ j=0, . . . , 3 of the subband may correspond to 40, 70, 70 and 100 frequency-converted coefficients. All subbands have different search start positions $k^j$ and different search ranges $w^j$ and similarity with the reference noise signal $\tilde{M}_{16}$ is detected. The search start position $k^j$ is fixed to 0 in case of j=0, 2 and depends on the start position of a subband having best similarity of a previous subband in case of J=1, 3. The search start position $k^j$ and search range $w^j$ of a j-th subband may be expressed as follows.

$$k^j = \begin{cases} 0 & j=0 \\ BestIdx^{j-1} + d^{j-1} - \frac{w^j}{2} & j=1 \\ 0 & j=2 \\ BestIdx^{j-1} + d^{j-1} - \frac{w^j}{2} & j=3 \end{cases} \quad \text{[Equation 6]}$$

$$w^j = \begin{cases} 240 & j=0 \\ 128 & j=1 \\ 210 & j=2 \\ 128 & j=3 \end{cases}$$

$k^j$ is a search start position, $BestIdx^j$ is a best similarity start position, $d^j$ is the length of a subband, and $w^j$ is a search range.

If $k^j$ becomes a negative number, $k^j$ is corrected to 0 and, if $k^j$ becomes greater than $280-d^j-w^j$, $k^j$ is corrected to $280-d^j-w^j$. The best similarity start position $BestIdx^j$ is estimated per subband through the following process.

First, similarity corr (k') corresponding to a similarity index k' is calculated by the following equation. Encoding is performed using a method similar to that of the generic mode, but searching is performed in units of four samples, not in units of one sample (one coefficient).

$$\mathrm{corr}(k') = \sum_{k=0}^{k<d^j} M_{32}^{j}(k)\tilde{M}_{16}(k^j + k' + k), \quad \text{[Equation 7]}$$

$$k' = 0, 3, 7, \ldots, w^j - 1$$

corr(k') is similarity, $M_{32}^{j}(k)$ is original noise (see Equation 5), $\tilde{M}_{16}$ is reference noise, $k^j$ is a search start position, k' is a similarity index and $w^j$ is a search range.

Energy corresponding to the similarity index k' is calculated by the following equation.

$$Ene(k') = \sum_{k=0}^{k<d^j} \tilde{M}_{16}(k^j + k' + k)^2, \quad \text{[Equation 8]}$$

$$k' = 0, 3, 7, \ldots, w^j - 1$$

Substantial similarity S(k') is expressed by the following equation.

$$S(k') = \left| \frac{\mathrm{corr}(k')}{\sqrt{Ene(k')}} \right| \quad \text{[Equation 9]}$$

The start position $BestIdx^j$ of a subband in which the substantial similarity S(k') has a best value is calculated as follows. $BestIdx^j$ is converted into a parameter $LagIndex^j$ and is included in a bitstream as noise position information.

```
BestIdx = 0
lagCorr = 0
lagEnergy = 1e30
for k' = 0 to w^j - 1
    if (Ene(k') > 0)
        if (lagCorr^2 Ene(k') < corr (k')lagEnergy)
            BestIdx^j = k'
            lagCorr = corr (k')
            lagEnergy = Ene (k')
        end
    end
end
```

Up to now, the process of generating the noise position information by the noise search unit 156 was described. Hereinafter, a process of generating noise energy information will be described. The reference noise signal may have a waveform similar to that of the original noise signal, but may have energy different from that of the original noise signal. It is necessary to generate and transmit noise energy information which is information about the energy of the original noise signal to the decoder such that the decoder has a noise signal having energy similar to that of the original noise signal.

The value of the noise energy may be converted into a pulse ratio value and may be transmitted, since dynamic range is large. Since the pulse ratio is a percentage of 0% to 100%, dynamic range is small and thus the number of bits may be reduced. This conversion process will be described.

The energy of the noise signal is equal to a value obtained by excluding pulse energy from the total energy of the SWB signal as shown in the following equation.

$$Noise_{energy} = \sum_{k=0}^{280} \{M_{32}(280+k)\}^2 - \hat{P}_{energy} \quad \text{[Equation 10]}$$

$Noise_{energy}$ is noise energy, $M_{32}$ is an SWB signal, and $\hat{P}_{energy}$ is pulse energy $$\left( \hat{P}_{energy} = \sum_{k=0}^{7} \{P_{amp}(k)\}^2 \right).$$

The above equation is expressed by a pulse ratio $\hat{R}_{percent}$ which is a percentage as follows.

$$\hat{R}_{percent} = \frac{\hat{P}_{energy}}{\hat{P}_{energy} + Noise_{energy}} \times 100 \quad \text{[Equation 11]}$$

$\hat{R}_{percent}$ is a pulse ratio, $\hat{P}_{energy}$ is pulse energy, and $Noise_{energy}$ is noise energy.

That is, the encoder transmits the pulse ratio $\hat{R}_{percent}$ shown in Equation 11, instead of the noise energy $Noise_{energy}$ shown in Equation 10. Noise energy information corresponding to this pulse ratio may be encoded using 4 bits as shown in FIG. 11.

Then, first, the decoder generates pulse energy $$\hat{P}_{energy} = \sum_{k=0}^{7} \{P_{amp}(k)\}^2$$

based on the pulse information generated by the pulse extractor 152. Then, the pulse energy $\hat{P}_{energy}$ and the transmitted pulse ratio $\hat{R}_{percent}$ are substituted into the following equation so as to generate noise energy $Noise_{energy}$.

$$No\hat{i}se_{energy} = \frac{(100 - \hat{P}_{energy}) \times \hat{R}_{percent}}{\hat{R}_{percent}} \quad \text{[Equation 12]}$$

Equation 12 is obtained by rearranging Equation 11.

The decoder may convert the transmitted pulse ratio into the noise energy as described above and multiply the noise energy and each coefficient of the reference noise signal so as to acquire a noise signal having an energy distribution similar to the original noise signal using the reference noise signal.

$$\hat{S}_{amp} = \sqrt{No\hat{i}se_{energy} \times \frac{1}{272}} \quad \text{[Equation 13]}$$

$$\tilde{\hat{M}}_{32}(k+280) = \tilde{M}_{32}(k+280) \times \hat{S}_{amp}$$

$$k = 0, \ldots, 280$$

The noise search unit 156 generates noise position information through the above process, converts a noise energy value into a pulse ratio, and transmits the pulse ratio to the decoder as the noise energy information.

FIG. 12 is a diagram showing the result of encoding a specific audio signal in a generic mode and a non-generic mode. First, referring to FIG. 12, the result of encoding and synthesizing a specific signal (e.g., a signal having high energy in a specific frequency band, such as percussion sound) in the generic mode and the result of encoding the specific signal in the non-generic mode and decoding the specific signal are different as shown in FIG. 12(A). Referring to FIG. 12(B), it can be seen that the result of encoding the original signal shown in FIG. 12 in the non-generic mode is more excellent than the result of encoding the original signal in the generic mode.

That is, if the energy of a predetermined pulse is high according to the property of an audio signal, it is possible to increase sound quality without substantially increasing the number of bits by performing encoding in the non-generic mode according to the embodiment of the present invention.

Hereinafter, the harmonic ratio determination unit 150, the non-harmonic-mode encoding unit 170 and the harmonic-mode encoding unit 180 shown in FIG. 1 in the case in which the audio signal is in the tonal mode due to high inter-frame similarity will be described.

Figure 13:
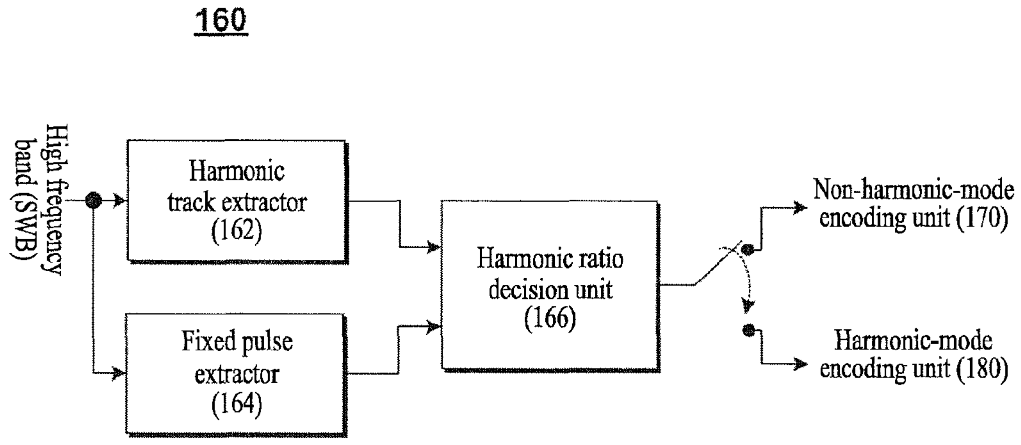
FIG. 13 is a diagram showing the detailed configuration of a harmonic ratio determination unit 160.

First, FIG. 13 is a diagram showing the detailed configuration of the harmonic ratio determination unit 160. Referring to FIG. 13, the harmonic ratio determination unit 160 may include a harmonic track extractor 162, a fixed pulse extractor 164 and a harmonic ratio decision unit 166 and decides a non-harmonic mode and a harmonic mode based on the harmonic ratio of the audio signal. The harmonic mode is suitable for encoding a signal in which a harmonic component of a single instrument is strong or a signal including a multiple pitch signal generated by several instruments.

Figure 14:
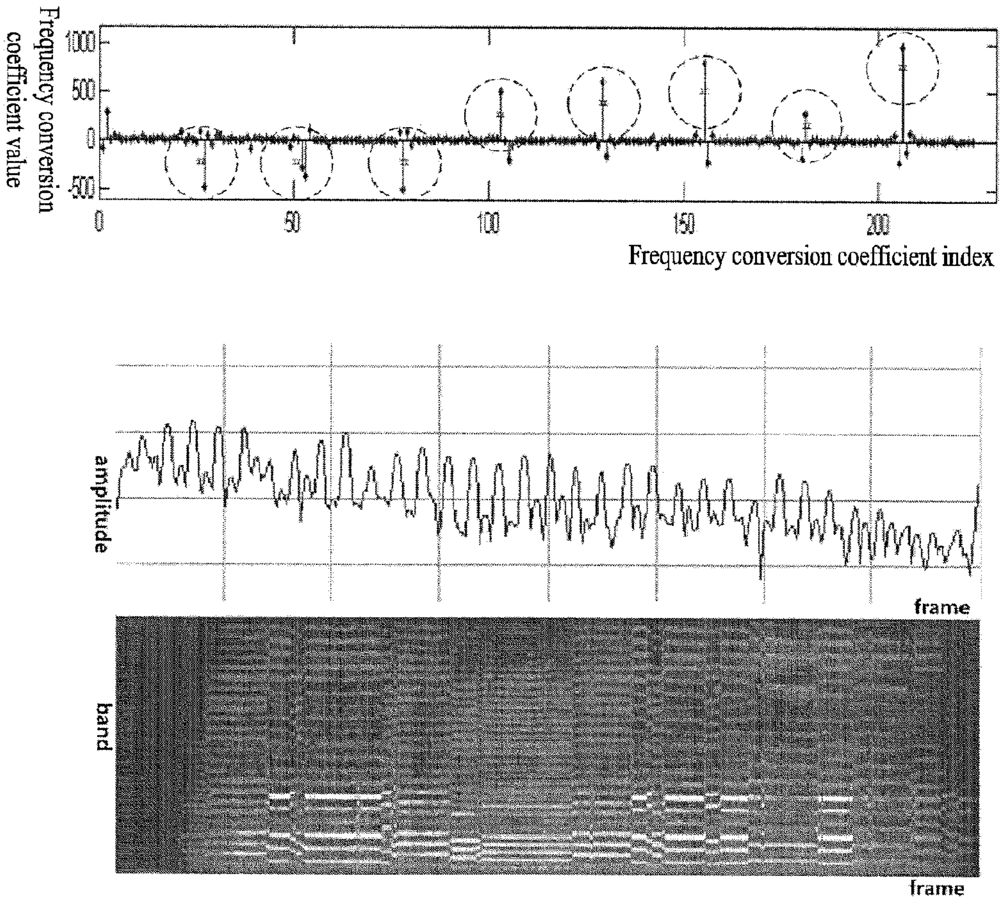
FIG. 14 is a diagram showing an audio signal with a high harmonic ratio.

FIG. 14 shows an audio signal with a high harmonic ratio. Referring to FIG. 14, it can be seen that harmonics which are multiples of a base frequency in a frequency conversion coefficient domain are strong. If a signal in which such a harmonic property is strong is encoded using a conventional method, all pulses corresponding to harmonics should be encoded. Thus, the number of consumed bits is increased and encoder performance is deteriorated. On the contrary, if an encoding method for extracting only a predetermined number of pulses is applied, it is difficult to extract all pulses. Thus, sound quality is deteriorated. Accordingly, the present invention proposes a coding method suitable for such a signal.

The harmonic track extractor 162 extracts a harmonic track from frequency-converted coefficients corresponding to a high frequency band. This process performs the same process as the harmonic track extractor 182 of the harmonic-mode encoding unit 180 and thus will be described in detail below.

The fixed pulse extractor 164 extracts a predetermined number of pulses decided in a predetermined region (164). This process performs the same process as the fixed pulse extractor 172 of the non-harmonic-mode encoding unit 170 and thus will be described in detail below.

The harmonic ratio decision unit 166 decides a non-harmonic mode if a harmonic ratio which is a ratio of fixed pulse energy to the energy sum of the extracted tracks is low and decides a harmonic mode if the harmonic ratio is high. As described above, the non-harmonic-mode encoding unit 170 is activated in the non-harmonic mode and the harmonic-mode encoding unit 180 is activated in the harmonic mode.

Figure 15:
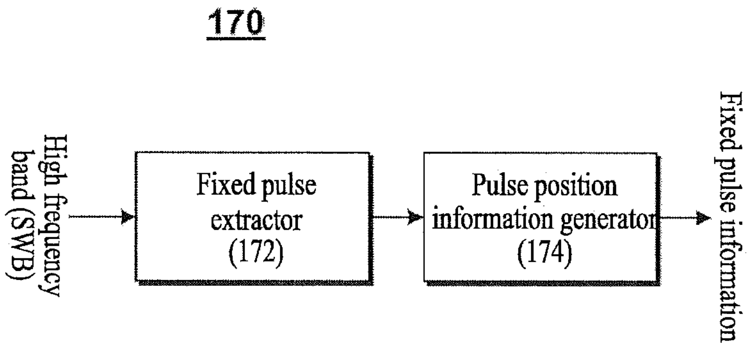
FIG. 15 is a diagram showing the detailed configuration of a non-harmonic-mode encoding unit 170.
Figure 16:
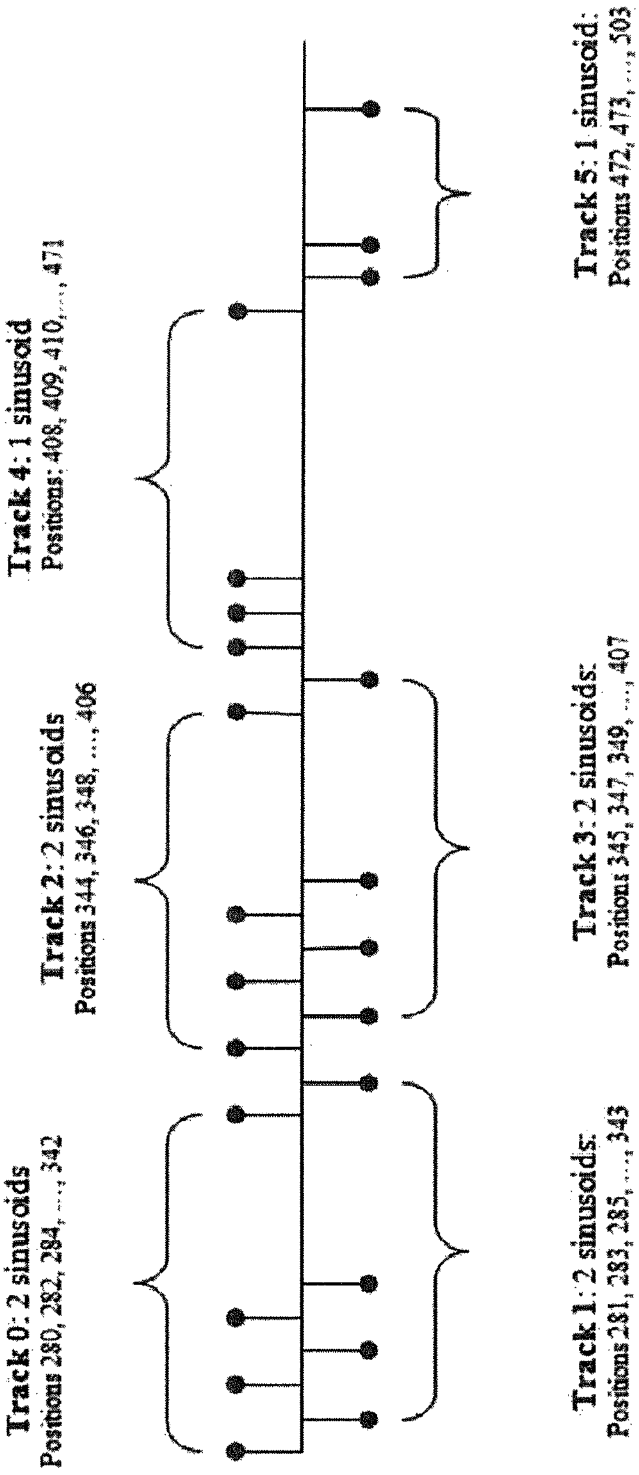
FIG. 16 is a diagram illustrating a rule of extracting a fixed pulse in case of a non-harmonic mode.

FIG. 15 is a diagram showing the detailed configuration of the non-harmonic-mode encoding unit 170, FIG. 16 is a diagram illustrating a rule of extracting a fixed pulse in case of the non-harmonic mode, and FIG. 17 is a diagram showing an example of syntax in case of performing encoding in the non-harmonic mode.

First, referring to FIG. 15, the non-harmonic-mode encoding unit 170 includes a fixed pulse extractor 172 and a pulse position information generator 174.

The fixed pulse extractor 172 extracts a fixed number of fixed pulses from a fixed region as shown in FIG. 16.

$$D(k) = |\ddot{M}_{32}(k) - M_{32}(k)|, k = 280, \ldots, 560 \quad \text{[Equation 14]}$$

where, $M_{32}(k)$ is an SWB signal and $\ddot{M}_{32}(k)$ is an HF synthesis signal.

The HF synthesis signal $\ddot{M}_{32}(k)$ is not present and thus is set to 0. In addition, a process of finding a maximum value of $M_{32}(k)$ is performed. D(k) is divided into 5 subbands so as to make $D_j$ and the number of pulses of each subband has a predetermined value $N_j$. A process of finding $N_j$ largest values per subband is performed as follows. The following algorithm is an alignment algorithm for finding and storing a maximum value N in a sequence input_data.

```
for j = 0 to N
    data_sorted(j) = 0
    data_sorted(j) = 0
    Idx = 0
    for k = 1 to length(input_data)
        if(input_data(j) > data_sorted(j))
            index_sorted(j) = k
            Idx= k
        end
    end
end
```

Referring to FIG. 16, an example of extracting a predetermined number (e.g., 10) of pulses from one of a plurality of position sets, that is, a first position set (e.g., even number positions) or a second position set (e.g., odd number positions), is shown per subband. In the first subband, two pulses (track 0) are extracted from even number positions (280, etc.) and two pulses (track 1) are extracted from odd number positions (281, etc.). Even in the second subband, similarly, two pulses (track 2) are extracted from even number positions (280, etc.) and two pulses (track 3) are extracted from odd number positions (281, etc.). Then, in the third subband, one pulse (track 4) is extracted regardless of position. Even in the fourth subband, one pulse (track 5) is extracted regardless of position.

The reason for extracting the fixed pulse, that is, the reason for extracting the predetermined number of pulses at a predetermined position, is because the number of bits corresponding to the position information of the fixed pulse is saved.

Referring to FIG. 15 again, the pulse position information generator 174 generates fixed pulse position information according to a predetermined rule with respect to the extracted fixed pulse. FIG. 17 shows an example of syntax in case of performing encoding in the non-harmonic mode. Referring to FIG. 17, if the fixed pulse is extracted according to the rule shown in FIG. 16, the positions of a total of 8 pulses from track 0 to track 3 are set to an even number or an odd number and thus the number of bits for encoding the fixed pulse position information may become 32 bits, not 64 bits. Since the pulses corresponding to track 4 are not restricted to an even number or an odd number, 64 bits are consumed. The pulses corresponding to track 5 are not restricted to an even number or an odd number, but the positions thereof are restricted to 472 to 503. Thus, 32 bits are necessary.

Hereinafter, a harmonic mode encoding process will be described with reference to FIGS. 18 to 20.

Figure 18:
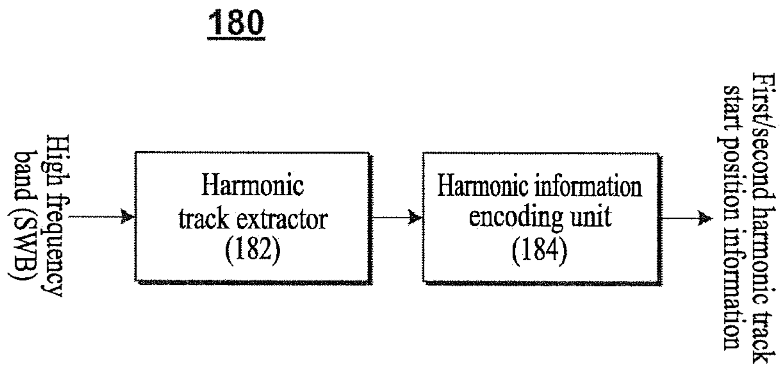
FIG. 18 is a diagram showing the detailed configuration of a harmonic-mode encoding unit 180.
Figure 19:
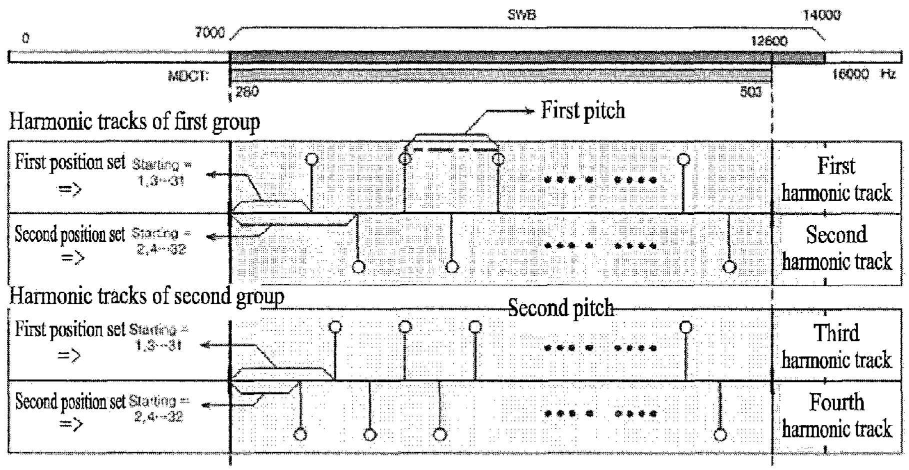
FIG. 19 is a diagram illustrating extraction of a harmonic track.
Figure 20:
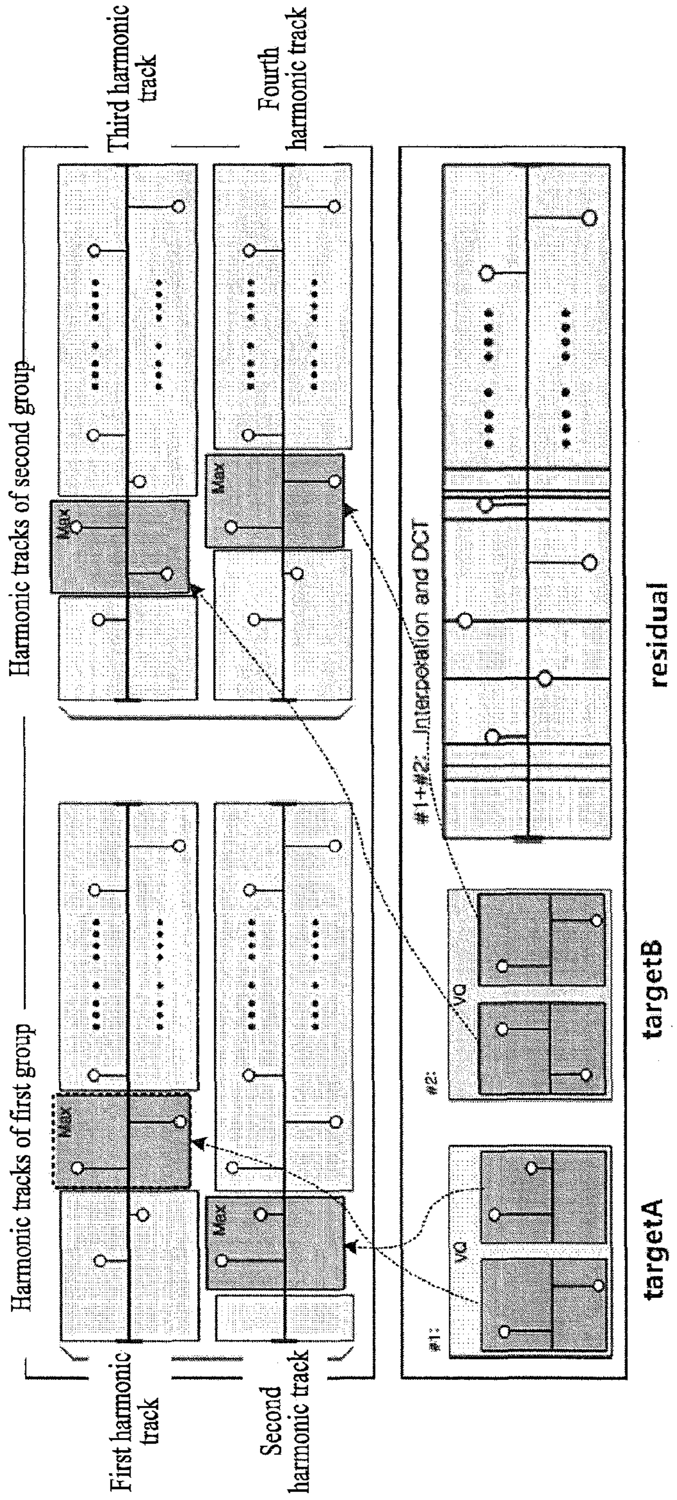
FIG. 20 is a diagram illustrating quantization of harmonic track position information.

FIG. 18 is a diagram showing the detailed configuration of a harmonic-mode encoding unit 180, FIG. 19 is a diagram illustrating extraction of a harmonic track, and FIG. 20 is a diagram illustrating quantization of harmonic track position information.

Referring to FIG. 18, the harmonic-mode encoding unit 180 includes a harmonic track extractor 182 and a harmonic information encoding unit 184.

The harmonic track extractor 182 extracts a plurality of harmonic tracks from the frequency-converted coefficients corresponding to a high frequency band. More specifically, harmonic tracks (a first harmonic track and a second harmonic track) of a first group corresponding to a first pitch are extracted and harmonic tracks (a third harmonic track and a fourth harmonic track) of a second group corresponding to a second pitch are extracted. Start position information of the first harmonic track and the third harmonic track may correspond to one of the first position set (e.g., an odd number) and start position information of the second harmonic track and the fourth harmonic track may correspond to one of the second position set (e.g., an even number).

Referring to FIG. 19(A), a first harmonic track having a first pitch and a second harmonic track having a first pitch are shown. For example, the start position of the first harmonic track may be expressed by an even number and the start position of the second harmonic track may be expressed by an odd number. Referring to FIG. 19(B), third and fourth harmonic tracks having a second pitch are shown. The start position of the third harmonic track may be set to an odd number and the start position of the fourth harmonic track may be set to an even number. If the number of harmonic tracks of each group is 3 or more (that is, a first group includes a harmonic track A, a harmonic track B and a harmonic track C and a second group includes a harmonic track K, a harmonic track L and a harmonic track M), the first position set corresponding to the harmonic track A/K is 3N (N being an integer), the second position set corresponding to the harmonic track B/L is 3N+1 (N being an integer), and the third position set corresponding to the harmonic track C/M is 3N+2 (N being an integer).

The above-described plurality of harmonic tracks may be obtained through the following equation.

$$D(k)=|\ddot{M}_{32}(k)-M_{32}(k)|, k=280, \ldots, 560 \qquad \text{[Equation 14]}$$

where, $M_{32}(k)$ is an SWB signal and $\ddot{M}_{32}(k)$ is an HF synthesis signal.

Since the HF synthesis signal is not present, if an initial value is set to 0, a process of finding a maximum value of $\ddot{M}_{32}(k)$ is performed.

D(k) is expressed by a sum of a predetermined number (e.g., a total of four) of harmonic tracks. Each harmonic track $D_j$ may include two or more pitch components as a maximum and two harmonic tracks $D_j$ may be extracted from one pitch component. A process of finding the harmonic track $D_j$ having two largest values per pitch component is as follows.

The following equation finds a pitch $P_i$ of a harmonic track $D_j$ including highest energy using an autocorrelation function. A pitch range may be restricted to coefficients of 20 to 27 of the frequency-converted coefficients so as to restrict the number of extracted harmonics.

$$P_i(m) = \sum_{n=280}^{560-m} (|M_{32}(n)| \times |M_{32}(n+m)|), \quad m = 20, \ldots, 27, \; i = 1, 2 \qquad \text{[Equation 15]}$$

The following equation is a process of calculating a start position $PS_i$ of a total of two harmonic tracks $D_j$ including highest energy per pitch $P_i$ so as to extract the harmonic track $D_j$. The range of the start positions $PS_i$ of the harmonic tracks $D_j$ is calculated by including the number of extracted harmonics and a total of two harmonic tracks $D_j$ is extracted by two start positions $PS_i$ per the pitch $P_i$ according to the property of an MDCT domain signal.

$$PS_i(2m-1) = \sum_{n=1}^{\lfloor 280/P_i \rfloor} |M_{32}[(2m-1) + P_i \times n]|, \quad m = 1, \ldots, 16 \qquad \text{[Equation 16]}$$

-continued $$PS_i(2m) = \sum_{n=1}^{\lfloor 280/P_i \rfloor} |M_{32}[(2m) + P_i \times n]|,$$

$$m = 1, \ldots, 16$$

The pitch $P_i$ of the four extracted harmonic tracks $D_j$ and the range and number of start positions $PS_i$ are shown in FIG. 19(C).

The harmonic information encoding unit 184 encodes and vector-quantizes the above-described information about the harmonic tracks.

The harmonic tracks extracted in the above process have pitch $P_i$ and the position information of the start positions $PS_i$. The extracted pitch $P_i$ and the start positions $PS_i$ are encoded as follows. The pitch $P_i$ is quantized using 3 bits by restricting the number of harmonics which may be present in HF and the start positions $PS_i$ are respectively quantized using four bits. Although a total of 22 bits may be used as position information for extracting a total of four harmonic tracks by using start positions $PS_i$ of two pitches $P_i$, the present invention is not limited thereto.

The four harmonic tracks extracted by the above process include a maximum of 44 pulses. In order to quantize the amplitude values and sign information of the 44 pulses, many bits are necessary. Accordingly, pulses including high energy are extracted from the pulses of each harmonic track using a pulse peak extraction algorithm and the amplitude values and sign information are separately encoded as shown in the following equation.

The following algorithm is an algorithm for extracting pulse peak PPi from each harmonic track, which finds contiguous pulses including high energy, quantizes the amplitude values, and separately encodes the sign information as shown in the following equation. 3 bits are used to extract a pulse peak from each harmonic track, the amplitude values of four pulses extracted from two harmonic tracks are quantized using 8 bits, and 1 bit is allocated to sign information. The pulses extracted through the pulse peak extraction algorithm are quantized to a total of 24 bits.

$$PP_i(n) = (|M_{32}(n)|^2 + |M_{32}(n+1)|^2),\ n = 1, \ldots, 5 \qquad \text{[Equation 17]}$$

$$PP_i(n-1) = (|M_{32}(n)|^2 + |M_{32}(n+1)|^2),\ n = 7$$

$$PP_i(n-2) = (|M_{32}(n)|^2 + |M_{32}(n+1)|^2),\ n = 9$$

$$PP_i(n-3) = (|M_{32}(n)|^2 + |M_{32}(n+1)|^2),\ n = 11$$

$$\text{Sign\_harpulse}_j(n) = \begin{cases} 1 & M_{32}(PP_i(n)) \geq 0 \\ -1 & \text{otherwise} \end{cases}$$

$$\text{Sign\_harpulse}_j(n) = \begin{cases} 1 & M_{32}(PP_i(n+1)) \geq 0 \\ -1 & \text{otherwise} \end{cases}$$

The harmonic tracks excluding the 8 pulses extracted by the above process are combined to one track and the amplitude value and sign information thereof are simultaneously quantized using DCT. For DCT quantization, 19 bits are used.

A process of encoding the pulses extracted through the pulse peak extraction algorithm of the four extracted harmonic tracks and the harmonic tracks excluding the pulses is shown in FIG. 20. Referring to FIG. 20, a first target vector targetA is generated with respect to a best pulse and pulses adjacent thereto of a first harmonic track of a first group and a best pulse and pulses adjacent thereto of a second harmonic track of the first group and a second target vector targetB is generated with respect to a best pulse and pulses adjacent thereto of a third harmonic track and a best pulse and pulses adjacent thereto of a fourth harmonic track. Vector quantization is performed with respect to the first target vector and the second target vector and the residual parts excluding the best pulse and the pulses adjacent thereto of each harmonic track are combined and subjected to frequency conversion. At this time, DCT may be used in frequency conversion as described above.

An example of information about the above-described harmonic track is shown in FIG. 21.

Figure 22:
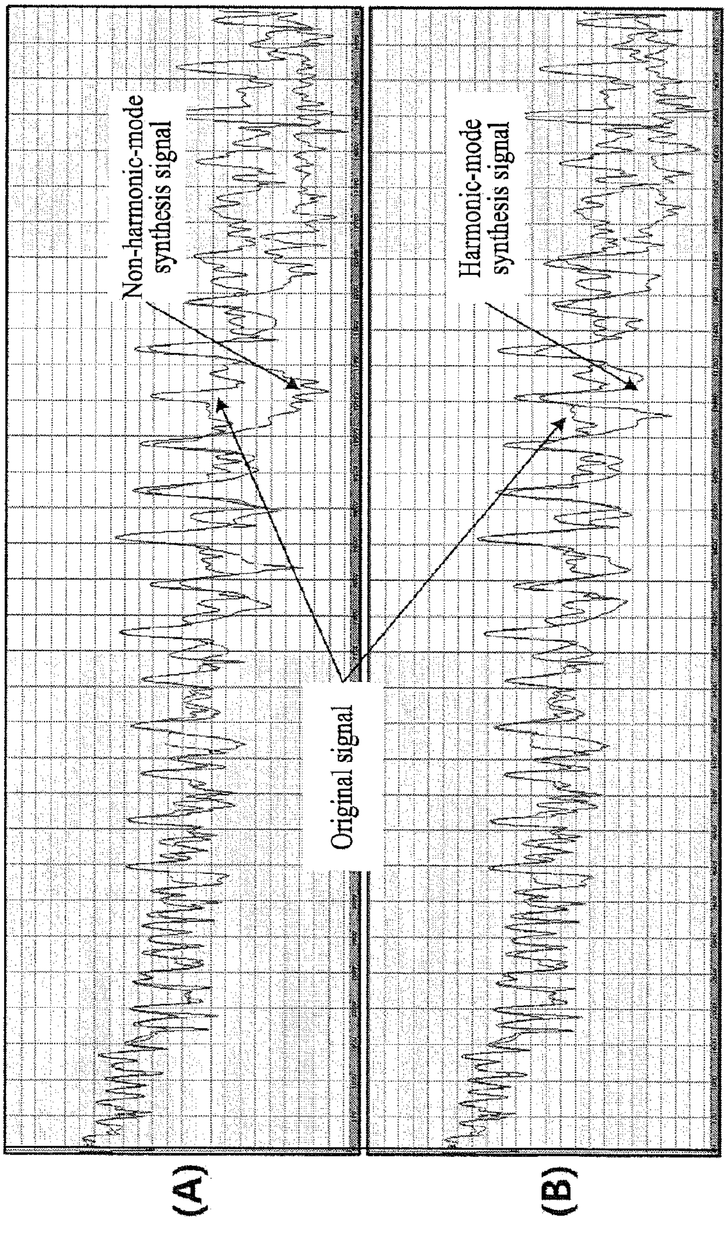
FIG. 22 is a diagram showing the result of encoding a specific audio signal in a non-harmonic mode and a harmonic mode.

FIG. 22 is a diagram showing the result of encoding a specific audio signal in a non-harmonic mode and a harmonic mode. Referring to FIG. 22, it can be seen that the result of encoding a signal having a strong harmonic component in the harmonic mode is closer to an original signal than the result of encoding the signal having the strong harmonic component and thus sound quality can be improved.

Figure 23:
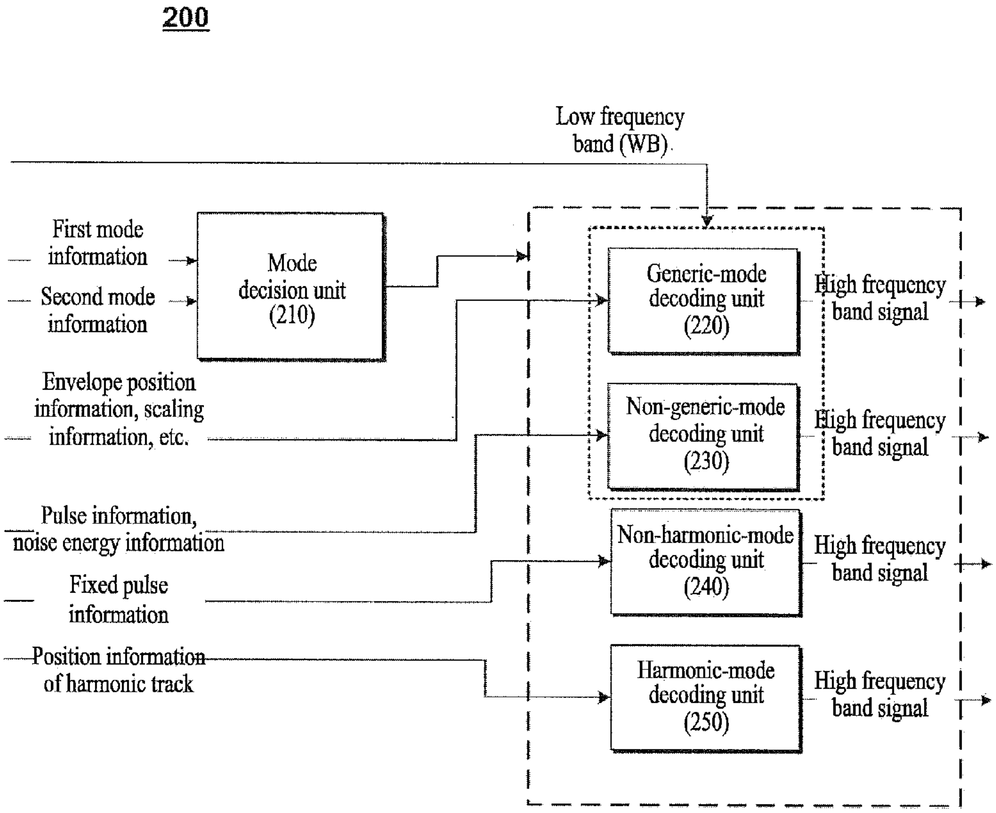
FIG. 23 is a diagram showing the configuration of a decoder of an audio signal processing apparatus according to an embodiment of the present invention.

FIG. 23 is a diagram showing the configuration of a decoder of an audio signal processing apparatus according to an embodiment of the present invention. Referring to FIG. 23, the decoder 200 according to the embodiment of the present invention includes at least one of a mode decision unit 210, a non-generic-mode decoding unit 230 and a harmonic-mode decoding unit 250 and may further include a generic-mode decoding unit 220 and a non-harmonic-mode decoding unit 240. The decoder may further include a demultiplexer (not shown) for parsing a bitstream of a received audio signal.

The mode decision unit 210 decides a mode corresponding to a current frame, that is, a current mode, based on first mode information and second mode information received through a bitstream. The first mode information indicates one of the non-tonal mode and the tonal mode and the second mode information indicates one of a generic mode or a non-generic mode if the first mode information indicates the non-tonal mode, similarly to the above-described encoder 100.

One of four decoding units 220, 230, 240 and 250 is activated in a current frame according to the decided current mode and a parameter corresponding to each mode is extracted by the demultiplxer (not shown) according to the current mode.

If the current mode is a generic mode, envelope position information, scaling information, etc. are extracted. Then, the generic-mode decoding unit 220 extracts a section corresponding to the envelope position information, that is, an envelope of a best similar band, from frequency-converted coefficients (WB signal) of a restored low frequency band. Then, the envelope is scaled using the scaling information so as to restore a high frequency band (SWB signal) of the current frame.

If the current mode is a non-generic mode, pulse information, noise position information, noise energy information, etc. are extracted. Then, the non-generic-mode decoding unit 230 generates a plurality of pulses (e.g., a total of three sets of main pulses and sub pulses and two separate pulses) based on the pulse information. The pulse information may include pulse position information, pulse sign information and pulse amplitude information. The sign of each pulse is decided according to the pulse sign information. The amplitude and position of each pulse is decided according to the pulse amplitude information and the pulse position information. Then, a section to be used as noise in the restored WB signal is decided using the noise position information, noise energy is adjusted using the noise energy information, and the pulses are summed, thereby restoring the SWB signal of the current frame.

If the current mode is a non-harmonic mode, fixed pulse information is extracted. The non-harmonic-mode decoding unit 240 acquires a position set per subband and predetermined number of fixed pulses using the fixed pulse information. The SWB signal of the current frame is generated using the fixed pulses.

If the current mode is a harmonic mode, position information of the harmonic track, etc. is extracted. The position information of the harmonic track includes start position information of harmonic tracks of a first group having a first pitch and start position information of harmonic tracks of a second group having a second pitch. The harmonic tracks of the first group may include a first harmonic track and a second harmonic track and the harmonic tracks of the second group may include a third harmonic track and a fourth harmonic track. The start position information of the first harmonic track and the third harmonic track may correspond to one of a first position set and the start position information of the second harmonic track and the fourth harmonic track may correspond to one of a second position set.

Pitch information indicating the first pitch and the second pitch may be further received. The harmonic-mode decoding unit 250 generates a plurality of harmonic tracks corresponding to the start position information using the pitch information and the start position information and generates an audio signal corresponding to the current frame, that is, an SWB signal, using the plurality of harmonic tracks.

The audio signal processing apparatus according to the present invention may be included in various products. Such products may be largely divided into a stand-alone group and a portable group. The stand-alone group may include a TV, a monitor, a set top box, etc. and the portable group may include a PMP, a mobile phone, a navigation system, etc.

Figure 24:
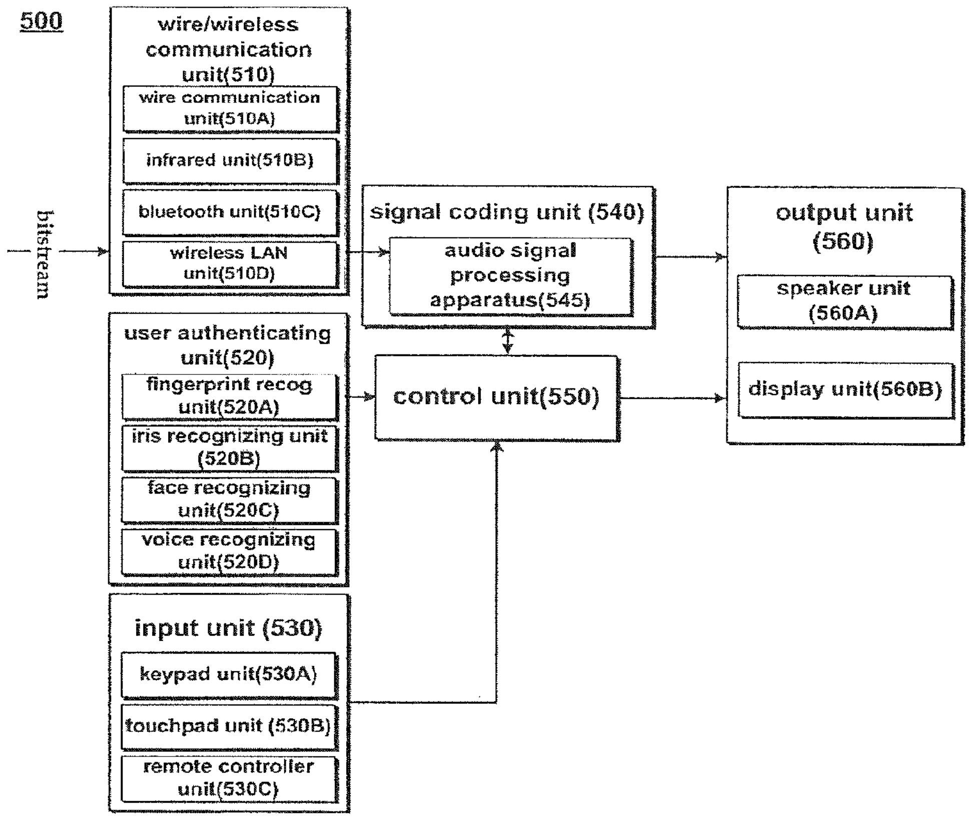
FIG. 24 is a schematic diagram showing the configuration of a product in which an audio signal processing apparatus according to an embodiment of the present invention is implemented.

FIG. 24 is a schematic diagram showing the configuration of a product in which an audio signal processing apparatus according to an embodiment of the present invention is implemented. First, referring to FIG. 24, a wired/wireless communication unit 510 receives a bitstream using a wired/wireless communication scheme. More specifically, the wired/wireless communication unit 510 may include at least one of a wired communication unit 510A, an infrared unit 510B, a Bluetooth unit 510C and a wireless LAN unit 510D.

A user authenticating unit 520 receives user information and performs user authentication and may include a fingerprint recognizing unit 520A, an iris recognizing unit 520B, a face recognizing unit 520C and a voice recognizing unit 520D, all of which respectively receive and convert fingerprint information, iris information, face contour information and voice information into user information and determine whether the user information matches previously registered user data so as to perform user authentication.

An input unit 530 enables a user to input various types of commands and may include at least one of a keypad unit 530A, a touch pad unit 530B and a remote controller unit 530C, to which the present invention is not limited.

A signal coding unit 540 encodes and decodes an audio signal and/or a video signal received through the wired/wireless communication unit 510 and outputs an audio signal of a time domain. The signal coding unit includes an audio signal processing apparatus 545 corresponding to the above-described embodiment of the present invention (the encoder 100 and/or the decoder 200 according to the first embodiment or the encoder 300 and/or the decoder 400 according to the second embodiment). The audio signal processing apparatus 545 and the signal coding unit including the same may be implemented by one or more processors.

A control unit 550 receives input signals from input devices and controls all processes of the signal decoding unit 540 and the output unit 560. The output unit 560 is a component for outputting an output signal generated by the signal decoding unit 540 and includes a speaker unit 560A and a display unit 560B. When the output signal is an audio signal, the output signal is output through a speaker and, if the output signal is a video signal, the output signal is output through the display.

FIG. 25 is a diagram showing a relationship between products in which an audio signal processing apparatus according to an embodiment of the present invention is implemented. FIG. 25 shows the relationship between a terminal and server corresponding to the product shown in FIG. 24. Referring to FIG. 25(A), a first terminal 500.1 and a second terminal 500.2 may bidirectionally communicate data or bitstreams through the wired/wireless communication unit. Referring to FIG. 16(B), the server 600 and the first terminal 500.1 may perform wired/wireless communication with each other.

The audio signal processing apparatus according to the present invention may be made as a computer-executable program and stored in a computer-readable recording medium, and multimedia data having a data structure according to the present invention may be stored in a computer-readable recording medium. Examples of the computer-readable recording medium include a ROM, a RAM, a CD-ROM, a magnetic tape, a floppy disc, optical data storage, and a carrier wave (e.g., data transmission over the Internet). A bitstream generated by the encoding method may be stored in a computer-readable recording medium or transmitted over a wired/wireless communication network.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to encoding and decoding of an audio signal.

The invention claimed is:

1. An audio signal processing method comprising:
- receiving an audio signal including a super wide band;
- obtaining a frequency-converted coefficient corresponding to the super wide band by performing frequency conversion with respect to the audio signal;
- generating a harmonic ratio based on the frequency-converted coefficient corresponding to the super wide band;
- obtaining a harmonic number based on the harmonic ratio, the harmonic number indicating a number of the super wide band which have harmonic characteristics;
- determining whether a current frame is a harmonic mode based on the harmonic number;
- quantizing the frequency-converted coefficient corresponding to the super wide band based on the harmonic mode;

generating target vectors using maximum pulses and the frequency-converted coefficient corresponding to the super wide band;

vector-quantizing the target vector and positions of the maximum pulses;

quantizing the positions the maximum pulses; and transmitting the audio signal including the quantized frequency-converted coefficient corresponding to the super wide band, mode information indicating the current frame is the harmonic mode and the quantized target vector and the quantized positions of the maximum pulses to decoder.

2. The audio signal processing method according to claim 1, wherein if the current frame is determined harmonic mode, the quantizing the frequency-converted coefficient corresponding to the super wide band based on the harmonic mode includes obtaining start position information corresponding to high frequency band.

3. The audio signal processing method according to claim 1, wherein if the current frame is determined harmonic mode, the quantizing the frequency-converted coefficient corresponding to the super wide band based on the harmonic mode includes allocating at least one of bit corresponding to the frequency-converted coefficient included in the audio signal.

4. The audio signal processing method according to claim 1, further comprising generating pitch information indicating a first pitch and a second pitch.

5. The audio signal processing method according to claim 1, wherein the harmonic number indicates 5 super wide bands having harmonic characteristics.

* * * * *